(12) United States Patent
Masciarelli et al.

(10) Patent No.: US 7,446,433 B2
(45) Date of Patent: Nov. 4, 2008

(54) METHODS AND APPARATUS FOR PROVIDING UNINTERRUPTIBLE POWER

(75) Inventors: Francis J. Masciarelli, Milford, MA (US); Srdan Mutabdzija, Somerville, MA (US); Eyob Demissie, Tyngsborough, MA (US); Michael J. Ingemi, Norwood, MA (US); Donald Lee Charlantini, Nashua, NH (US)

(73) Assignee: American Power Conversion Corporation, West Kingston, RI (US)

( * ) Notice: Subject to any disclaimer, the term of this patent is extended or adjusted under 35 U.S.C. 154(b) by 290 days.

(21) Appl. No.: 10/764,344

(22) Filed: Jan. 23, 2004

(65) Prior Publication Data

US 2005/0162019 A1    Jul. 28, 2005

(51) Int. Cl.
*H02J 7/00*    (2006.01)
(52) U.S. Cl. .......................................... 307/66
(58) Field of Classification Search ................. 307/26, 307/66
See application file for complete search history.

(56) References Cited

U.S. PATENT DOCUMENTS

| | | |
|---|---|---|
| 4,065,711 A | 12/1977 | Kawabata |
| 4,665,322 A | 5/1987 | Eishima et al. |
| 4,673,826 A | 6/1987 | Masson |
| 4,709,202 A | 11/1987 | Koenck et al. |
| 4,763,013 A | 8/1988 | Gvoth, Jr. et al. |
| 4,816,982 A | 3/1989 | Severinsky |
| 4,823,247 A | 4/1989 | Tamoto |
| 4,827,151 A | 5/1989 | Okado |

(Continued)

FOREIGN PATENT DOCUMENTS

CN    1121077 C    1/2001

(Continued)

OTHER PUBLICATIONS

Invitation to Pay Additional Fees with Partial International Search Report for PCT/US2005/001992 mailed May 13, 2005.

(Continued)

*Primary Examiner*—Robert L. Deberadinis
(74) *Attorney, Agent, or Firm*—Lowrie, Lando & Anastasi, LLP

(57) ABSTRACT

Power supply systems and methods are provided. In one aspect, a power supply system includes a frame, a power input to receive input power from a power source, a power output to provide output power to a load, at least one battery module mounted in the frame and having a battery output that provides battery power, at least one power module mounted in the frame and coupled to the power input to receive the input power, coupled to the battery output to receive the battery power, and coupled to the power output to provide the output power from at least one of the battery power and the input power, a first controller coupled to the at least one power module, and a second controller, substantially similar to the first controller, coupled to the first controller, and coupled to the at least one power module, wherein each of the first controller and the second controller are configured to determine operational parameters of the power supply system and store a first set of parameters determined by the first controller and a second set of parameters determined by the second controller.

85 Claims, 11 Drawing Sheets

U.S. PATENT DOCUMENTS

| | | | |
|---|---|---|---|
| 4,831,508 A | 5/1989 | Hunter |
| 4,935,861 A | 6/1990 | Johnson, Jr. et al. |
| 4,943,902 A | 7/1990 | Severinsky |
| 4,964,029 A | 10/1990 | Severinsky et al. |
| 4,980,812 A | 12/1990 | Johnson, Jr. et al. |
| 5,017,800 A | 5/1991 | Divan |
| 5,019,717 A | 5/1991 | McCurry et al. |
| 5,045,989 A | 9/1991 | Higaki et al. |
| 5,047,961 A | 9/1991 | Simonsen |
| 5,057,698 A | 10/1991 | Widener et al. |
| 5,089,974 A | 2/1992 | Demeyer et al. |
| 5,099,410 A | 3/1992 | Divan |
| 5,126,585 A | 6/1992 | Boys |
| 5,184,025 A | 2/1993 | McCurry et al. |
| 5,227,262 A | 7/1993 | Ozer |
| 5,241,217 A | 8/1993 | Severinsky |
| 5,254,928 A | 10/1993 | Young et al. |
| 5,272,382 A | 12/1993 | Heald et al. |
| 5,281,955 A | 1/1994 | Reich et al. |
| 5,291,383 A | 3/1994 | Oughton |
| 5,302,858 A | 4/1994 | Folts |
| 5,315,533 A | 5/1994 | Stich et al. |
| 5,319,571 A | 6/1994 | Langer et al. |
| 5,349,282 A | 9/1994 | McClure |
| 5,382,893 A | 1/1995 | Dehnel |
| 5,384,792 A | 1/1995 | Hirachi |
| 5,422,558 A | 6/1995 | Stewart |
| 5,457,377 A | 10/1995 | Jonsson |
| 5,458,991 A | 10/1995 | Severinsky |
| 5,465,011 A | 11/1995 | Miller et al. |
| 5,477,091 A | 12/1995 | Fiorina et al. |
| 5,504,415 A | 4/1996 | Podrazhansky et al. |
| 5,510,690 A | 4/1996 | Tanaka et al. |
| 5,519,306 A | 5/1996 | Itoh et al. |
| 5,563,493 A | 10/1996 | Matsuda et al. |
| 5,602,462 A | 2/1997 | Stich et al. |
| 5,642,002 A | 6/1997 | MeKanik et al. |
| 5,654,591 A | 8/1997 | Mabboux et al. |
| 5,684,686 A | 11/1997 | Reddy |
| 5,901,057 A | 5/1999 | Brand et al. |
| 5,940,274 A | 8/1999 | Sato et al. |
| 5,982,652 A | 11/1999 | Simonelli et al. |
| 6,069,412 A | 5/2000 | Raddi et al. |
| 6,121,695 A | 9/2000 | Loh |
| 6,169,669 B1 | 1/2001 | Choudhury |
| 6,184,593 B1 | 2/2001 | Jungreis |
| 6,201,319 B1 | 3/2001 | Simonelli et al. |
| 6,274,950 B1 | 8/2001 | Gottlieb et al. |
| 6,292,379 B1 | 9/2001 | Edevold et al. |
| 6,310,783 B1 | 10/2001 | Winch et al. |
| 6,317,348 B1 | 11/2001 | Vackar |
| 6,318,783 B1 | 11/2001 | Knox |
| 6,381,156 B1 | 4/2002 | Sakai et al. |
| 6,400,043 B1 | 6/2002 | Batson et al. |
| 6,400,591 B2 | 6/2002 | Reilly et al. |
| 6,424,119 B1 | 7/2002 | Nelson et al. |
| 6,433,444 B1 | 8/2002 | de Vries |
| 6,445,088 B1 | 9/2002 | Spitaels et al. |
| 6,455,954 B1 | 9/2002 | Dailey |
| 6,489,561 B2 | 12/2002 | Ziegler et al. |
| 6,584,329 B1 | 6/2003 | Wendelrup et al. |
| 6,654,265 B2 | 11/2003 | Sadler et al. |
| 6,700,351 B2 | 3/2004 | Blair et al. |
| 6,803,678 B2 | 10/2004 | Gottlieb et al. |
| 2001/0009361 A1 | 7/2001 | Downs et al. |
| 2001/0012579 A1 | 8/2001 | Vackar |
| 2002/0136042 A1 | 9/2002 | Layden et al. |
| 2003/0048647 A1 | 3/2003 | Sadler et al. |
| 2003/0052644 A1 | 3/2003 | Nelson et al. |
| 2003/0214507 A1 | 11/2003 | Mawatari et al. |
| 2004/0160210 A1 | 8/2004 | Bohne et al. |
| 2005/0036248 A1 | 2/2005 | Klikic et al. |
| 2005/0162129 A1 | 7/2005 | Mutabdzija et al. |
| 2005/0162836 A1 | 7/2005 | Briggs et al. |
| 2005/0164563 A1 | 7/2005 | Schuttler et al. |

FOREIGN PATENT DOCUMENTS

| | | |
|---|---|---|
| EP | 0 574 628 A1 | 12/1993 |
| EP | 0 575 060 B1 | 9/1996 |
| EP | 1 291 999 A1 | 3/2003 |
| WO | WO 02/057925 A2 | 7/2002 |

OTHER PUBLICATIONS

International Search Report for PCT/US2005/001992, mailed Jul. 20, 2005.

Symmetra Brochure, "Server, Network and Telecom Power Soultions," pp. 1-20.

English translation of the Chinese First Notification of Office Action mailed Sep. 21, 2007, 9 pps.

English Abstract of Published Application for Chinese Patent No. CN1121077C, 1 pp.

US 7,446,433 B2

METHODS AND APPARATUS FOR PROVIDING UNINTERRUPTIBLE POWER

BACKGROUND OF INVENTION

1. Field of Invention

Embodiments of the invention relate generally to methods and apparatus for providing uninterruptible, regulated power to critical and/or sensitive loads. More specifically, embodiments of the invention relate to uninterruptible power supplies (UPS) having improved control systems.

2. Discussion of Related Art

The use of uninterruptible power supplies having back-up systems to provide regulated, uninterrupted power for sensitive and/or critical loads, such as computer systems and other data processing systems, is known. FIG. 1 shows a typical, single phase, on-line UPS 10 used to provide regulated, uninterrupted power. The UPS 10 includes an input circuit breaker/filter 12, a rectifier 14, a control switch 15, a controller 16, a battery 18, an inverter 20 and an isolation transformer 22. The UPS also includes an input 24 for coupling to an AC power source, and an outlet 26 for coupling to a load.

The UPS 10 operates as follows. The circuit breaker/filter 12 receives input AC power from the AC power source through the input, filters the input AC power and provides filtered AC power to the rectifier 14. The rectifier rectifies the input voltage. The control switch 15 receives the rectified power and also receives DC power from the battery 18. The controller 16 determines whether the power available from the rectifier is within predetermined tolerances, and if so, controls the control switch to provide the power from the rectifier to the inverter 20. If the power from the rectifier is not within the predetermined tolerances, which may occur because of "brown out" or "black out" conditions, or due to power surges, then the controller controls the control switch to provide the DC power from the battery to the inverter 20.

The inverter 20 of the UPS 10 receives DC power and converts the DC power to AC power and regulates the AC power to predetermined specifications. The inverter 20 provides the regulated AC power to the isolation transformer 22. The isolation transformer is used to increase or decrease the voltage of the AC power from the inverter and to provide isolation between a load and the UPS. The isolation transformer is typically an optional device, the use of which is typically dependent on UPS output power specifications. Depending on the capacity of the battery and the power requirements of the load, the UPS 10 can provide power to the load during brief power source dropouts or for extended power outages.

Modular UPS systems having redundant control features are also known, and one such system is described in U.S. Pat. No. 5,982,652, the contents of which are incorporated herein by reference. In typical modular UPS systems, additional power modules and battery modules can be added to a UPS system to provide increased output power and longer runtime while on battery.

The use of split-phase power input and outputs in UPS systems is also known. In a typical split-phase UPS, the input of the UPS is configured to receive up to two phases and a neutral from an AC power system and to provide two phases and a neutral at the output of the UPS. Split-phase systems generally provide greater flexibility for a user in that they can support a number of different output power specifications. While split-phase systems generally provide greater flexibility, these systems typically require more complex control systems.

Further, it is often desirable to leave a UPS in a powered down state, and restart the UPS when no AC power is available. Modular systems having this capability are known and include the Symmetra® UPS System available from American Power Conversion Corporation, West Kingston, R.I. In high power, modular systems, it is often difficult to prevent battery drain during a power down mode from which the UPS may be restarted, and it is desirable to minimize the drain that does occur on the batteries.

SUMMARY OF INVENTION

Embodiments of the invention provide improvements to UPS systems, such as those described above, and in particular, some embodiments of the invention provide improved control systems to UPS systems having split-phase power inputs and outputs.

A first aspect of the invention is directed to a power supply system. The power supply system includes a frame, a power input to receive input power from a power source, a power output to provide output power to a load, at least one battery module mounted in the frame and having a battery output that provides battery power, at least one power module mounted in the frame and coupled to the power input to receive the input power, coupled to the battery output to receive the battery power, and coupled to the power output to provide the output power from at least one of the battery power and the input power, a first controller coupled to the at least one power module, and a second controller, substantially similar to the first controller, coupled to the first controller, and coupled to the at least one power module. Each of the first controller and the second controller is configured to determine operational parameters of the power supply system and store a first set of parameters determined by the first controller and a second set of parameters determined by the second controller.

In the power supply system, the first controller may function as a main controller in the power supply system and control the output power of the power module, and the first controller and the second controller may be configured to allow the second controller to control the output power upon failure of the first controller. The at least one power module may include a plurality of power modules, and the at least one battery module may include a plurality of power modules. The power supply system can further include a communications bus coupled to the first controller, the second controller and the at least one power module to provide duplex communication between the first controller, the second controller and the at least one power module. The first controller may be configured to function as master of the communications bus and control communications on the bus, and the second controller may configured to function as master of the communications bus upon failure of the first controller.

In the power supply system each of the first controller and the second controller may include a main processor, an internal communications bus coupled to the communications bus through a relay, and a memory device, coupled to the internal communications bus, that stores operational parameters of the power supply system, and the main processor in the second controller may be configured to open the relay in the second controller and send updated operational parameters to the memory device over the internal communications bus.

The power input of the power supply system can be configured to receive input power having a first input phase line, a second input phase line and a neutral input line, and the first controller can be coupled to the power input and configured to detect an input phase difference between the first input phase line and the second input phase line, and to control the power module to provide output power having a first output phase line, a second output phase line and a neutral output line, with an output phase difference between the first output phase line and the second output phase line substantially equal to the input phase difference. Each of the first controller and the second controller can include a cold start button, and the power supply system can be configured to be powered on from battery power with no input power present when one of the cold start buttons is activated by a user. The power supply system can be configured such that activation of the cold start button powers on the power supply system with no input power present, and with substantially zero current from the at least one battery module prior to activation of the cold start button. The first controller can be coupled to the power input and configured to detect input voltage and input current, and to reduce input current draw of the power supply system upon detection that the input voltage is less than a predetermined threshold. The first controller may configured to reduce battery charging current in the power supply system upon detection that the input voltage is less than the predetermined threshold.

The power supply system may further include a four-quadrant power meter coupled to the power output that determines output power of the power supply system, and the at least one power module can include a two-quadrant power meter that determines output power of the power module. The power supply system may further include an output fuse coupled to the power output, and a detection circuit, coupled to the output fuse and to the first controller that detects a voltage across the output fuse. Each of the first controller and the second controller may be adapted to receive an input signal from the frame, and based on a state of the input signal, to function as a main controller or a redundant controller. The first controller may include a memory device, and be configured to sense an output voltage at the output, and compare the output voltage with upper and lower threshold levels derived from data contained in the memory device to determine if the output voltage is within a predetermined range.

Another aspect of the invention is directed to a power supply system that includes a power input to receive input power from a power source, a power output to provide output power to a load, at least one battery module having a battery output that provides battery power, at least one power module coupled to the power input to receive the input power, coupled to the battery output to receive the battery power, and coupled to the power output to provide the output power, a first controller coupled to the at least one power module, a second controller, coupled to the first controller, and coupled to the at least one power module and a communications bus coupled to the first controller, the second controller and the at least one power module to provide duplex communication between the first controller, the second controller and the at least one power module. The first controller is configured to function as master of the communications bus and control communications on the bus, and the second controller is configured to function as master of the communications bus upon failure of the first controller.

Another aspect of the invention is directed to a power supply system that includes an input to receive input power having a first input phase line, a second input phase line and a neutral input line, an output to provide output power, the output having a first output phase line, a second output phase line and a neutral output line, a battery that provides battery power, and a controller coupled to the input, to the output and to the battery and configured to control the power supply system to provide the output power from at least one of the input power and the battery power. The controller is configured to detect an input phase difference between the first input phase line and the second input phase line, and to provide output power with an output phase difference between the first output phase line and the second output phase line substantially equal to the input phase difference.

A power supply system in accordance with another aspect of the invention includes an input to receive input power, an output to provide output power, a battery that provides battery power, power circuitry that receives the input power and the battery power and provides the output power from at least one of the battery power and the input power, and a controller coupled to the input, to the output, to the power circuitry, and to the battery and configured to control the power supply system. The controller includes a storage device that stores operational settings for the power supply system, wherein the controller is configured to sense an output voltage at the output, and compare the output voltage with upper and lower threshold levels derived from the operational settings contained in the storage device to determine if the output voltage is within a predetermined range.

Another aspect of the invention is directed to a power supply system that includes an input to receive input power, an output to provide output power, a battery that provides battery power, power circuitry that receives the input power and the battery power and provides the output power from at least one of the battery power and the input power, and a controller coupled to the input, to the output, to the power circuitry, and to the battery and configured to detect an output voltage and an output current, a bypass device, coupled between the input and the output, the bypass device having an open state and having a closed state in which the input is electrically coupled through the bypass device to the output to provide the input power to the output. The controller is configured to determine if the output voltage is within a predetermined range, determine if a short circuit exists at the output, and to control the bypass device to switch to the closed state if the output voltage is outside a predetermined range in the absence of a short circuit.

Another aspect of the invention is directed to a power supply system that includes a frame a power input to receive input power from a power source, a power output to provide output power to a load, at least one battery module mounted in the frame and having a battery output that provides battery power, at least one power module, mounted in the frame and coupled to the power input to receive the input power, coupled to the battery output to receive the battery power, and coupled to the power output to provide the output power from at least one of the battery power and the input power, a first controller module, mounted in the frame, coupled to the at least one power module and the at least one battery module, and a first cold start button operatively coupled to the at least one battery module. The power supply system is configured to be powered on from battery power with no input power present from a powered down mode in which there is no current being drawn from the battery when the first cold start button is activated by a user.

Another power supply system of the invention includes a frame, a power input to receive input power from a power source, a power output to provide output power to a load, at least one battery module mounted in the frame and having a battery output that provides battery power, at least one power module mounted in the frame and coupled to the power input to receive the input power, coupled to the battery output to receive the battery power, and coupled to the power output to provide the output power from at least one of the battery power and the input power, a first controller coupled to the at least one power module, and a second controller, substantially similar to the first controller, coupled to the first controller, and coupled to the at least one power module. Each of the first controller and the second controller includes means for measuring operational parameters of the power supply system and means for storing operational parameters measured by the first controller and measured by the second controller.

In another aspect of the invention, a power supply system includes a power input to receive input power from a power source, a power output to provide output power to a load, at least one battery module having a battery output that provides battery power, at least one power module coupled to the power input to receive the input power, coupled to the battery output to receive the battery power, and coupled to the power output to provide the output power, a first controller coupled to the at least one power module, a second controller, coupled to the first controller, and coupled to the at least one power module, and a communications bus coupled to the first controller, the second controller and the at least one power module to provide duplex communication between the first controller, the second controller and the at least one power module. The power supply system also includes means for establishing the first controller as master of the communications bus and for establishing the second controller as master of the communications bus upon failure of the first controller.

Still another aspect of the invention is directed to a power supply system that includes an input to receive input power having a first input phase line, a second input phase line and a neutral input line, an output to provide output power, the output having a first output phase line, a second output phase line and a neutral output line, a battery that provides battery power, and a controller coupled to the input, to the output and to the battery and configured to control the power supply system to provide the output power from at least one of the input power and the battery power. The power supply system further includes means for detecting an input phase difference between the first input phase line and the second input phase line, and providing output power with an output phase difference between the first output phase line and the second output phase line substantially equal to the input phase difference.

A power supply system of another aspect of the invention includes an input to receive input power, an output to provide output power, a battery that provides battery power, power circuitry that receives the input power and the battery power and provides the output power from at least one of the battery power and the input power, and a controller coupled to the input, to the output, to the power circuitry, and to the battery and configured to control the power supply system. The power supply system further includes means for storing operational settings for the power supply system and comparing an output voltage with upper and lower threshold levels derived from the operational settings to determine if the output voltage is within a predetermined range.

Another aspect of the invention is directed to a power supply system that includes an input to receive input power, an output to provide output power, a battery that provides battery power, power circuitry that receives the input power and the battery power and provides the output power from at least one of the battery power and the input power, a controller coupled to the input, to the output, to the power circuitry, and to the battery and configured to detect an output voltage and an output current, and means for bypassing the power circuitry to provide input power to the power output, for detecting a short circuit at the power output and for disabling the bypass means when a short circuit is detected.

Still another aspect of the invention is directed to a power supply system. The power supply system includes a frame, a power input to receive input power from a power source, a power output to provide output power to a load, at least one battery module mounted in the frame and having a battery output that provides battery power, at least one power module mounted in the frame and coupled to the power input to receive the input power, coupled to the battery output to receive the battery power, and coupled to the power output to provide the output power from at least one of the battery power and the input power, and a first controller module, mounted in the frame, coupled to the at least one power module and the at least one battery module. The power supply system further includes means, coupled to the first controller module, for starting the power supply system from battery power with no input power present.

Another aspect of the invention is directed to a method of providing redundant control of an uninterruptible power supply having a first controller and a second controller. The method includes determining a first set of values corresponding to operational parameters of the uninterruptible power supply using the first controller, determining a second set of values corresponding to the operational parameters of the uninterruptible power supply using the second controller, storing the first set of values and the second set of values in the first controller, storing the first set of values and the second set of values in the second controller, controlling output power of the uninterruptible power supply using the first controller, and upon failure of the first controller, controlling the output power of the uninterruptible power supply using the second controller.

Another aspect of the invention is directed to a method of controlling an uninterruptible power supply system having a first controller, a second controller, at least one power module, and a communications bus coupled between the first controller, the second controller and the at least one power module. The method includes controlling output power of the uninterruptible power supply and communications over the communications bus using the first controller, and upon failure of the first controller, controlling the output power and communications over the communications bus using the second controller.

In another aspect of the invention, a method of providing uninterruptible output power includes detecting an input phase difference between a first input phase line and a second input phase line, and providing output power with an output phase difference between a first output phase line and a second output phase line substantially equal to the input phase difference.

In yet another aspect of the invention, a method of controlling output power in an uninterruptible power supply is provided. The method includes storing operational settings for the uninterruptible power supply in a storage device, and comparing an output voltage with upper and lower threshold levels derived from the operational settings to determine if the output voltage is within a predetermined range.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
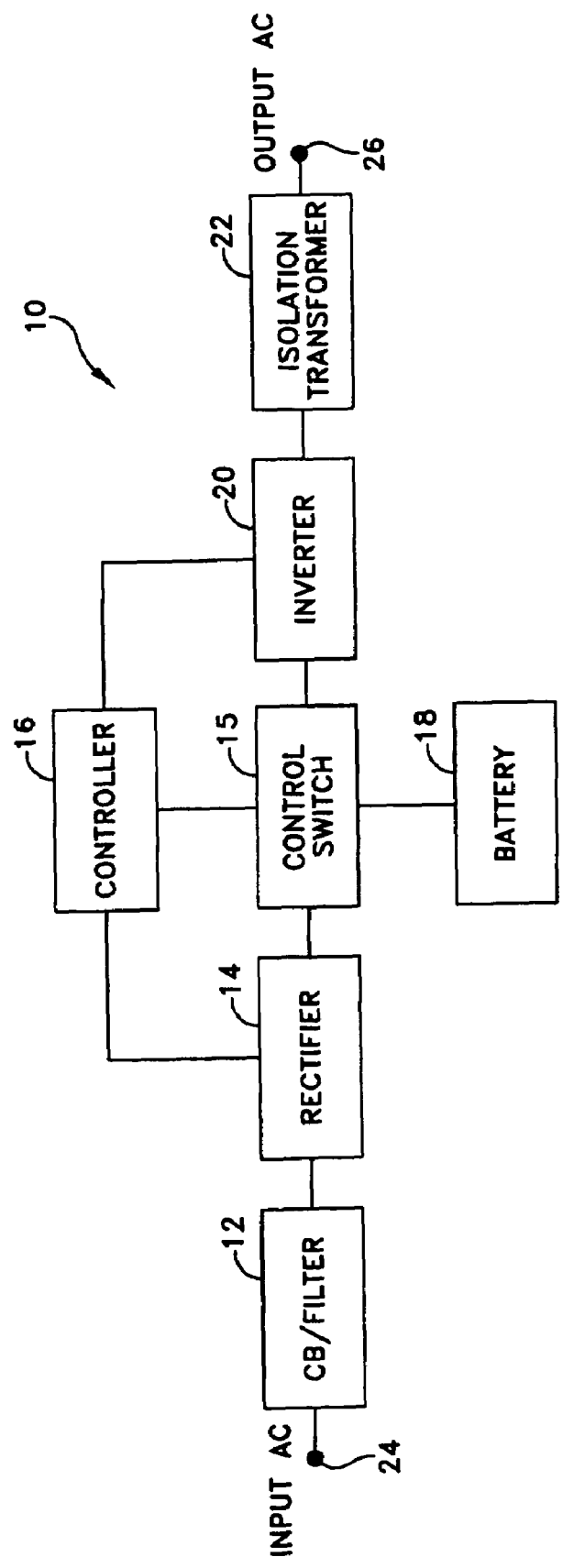
FIG. 1 shows a block diagram of a prior art UPS system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
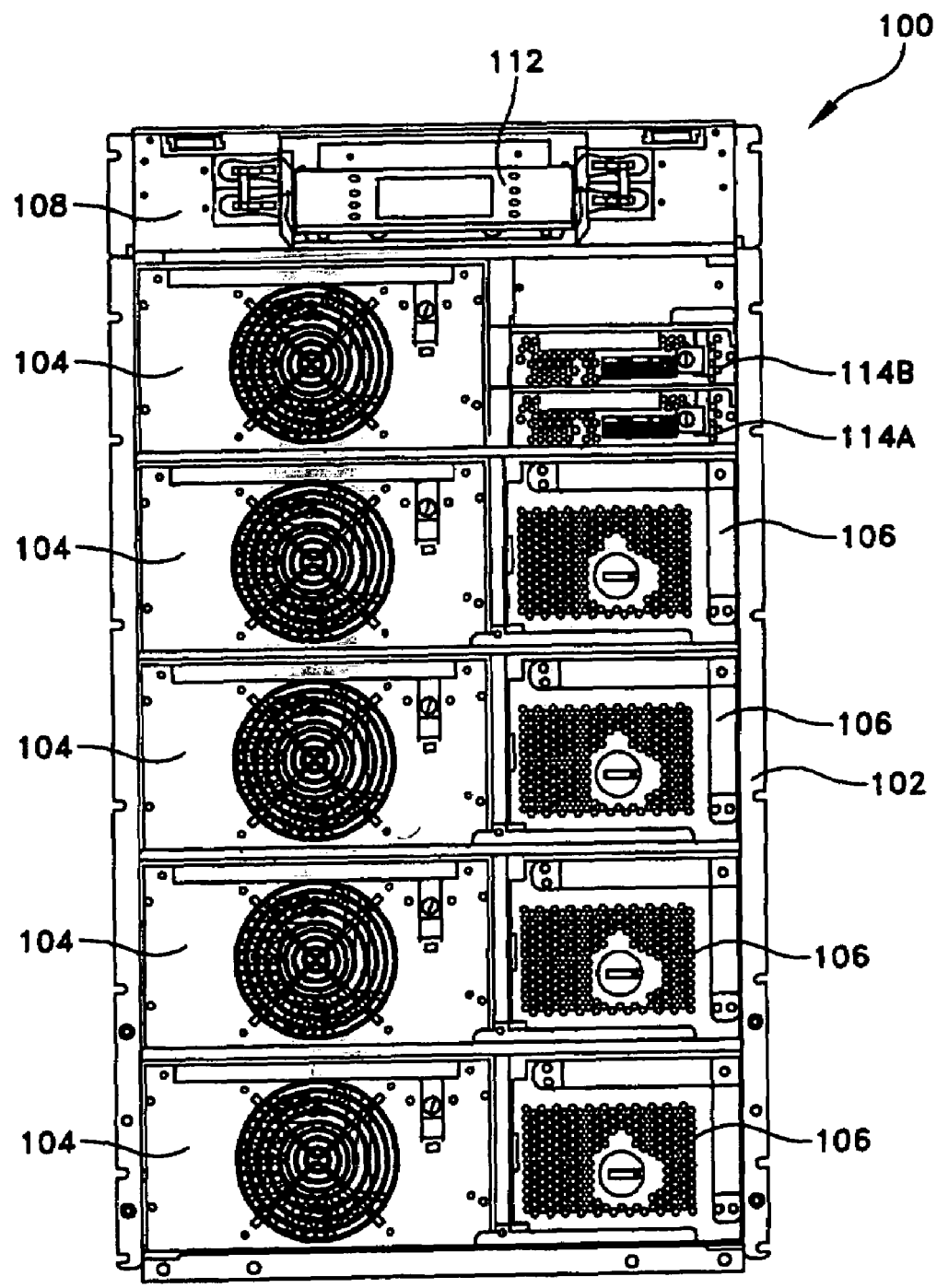
FIG. 2 shows a front view of a modular split-phase UPS system in accordance with one embodiment of the present invention.
Figure 3:
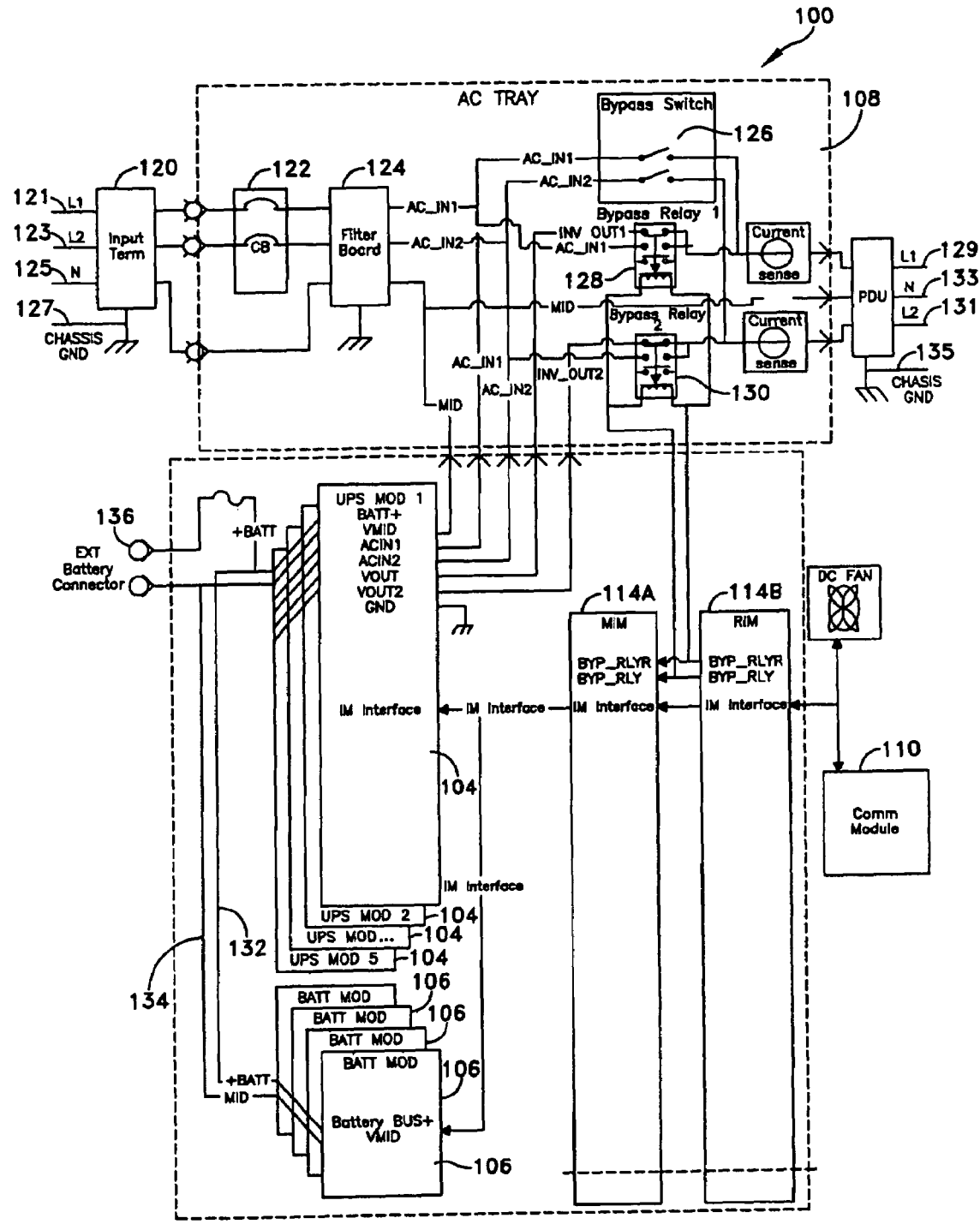
FIG. 3 shows a functional block diagram of the UPS system of FIG. 2.

FIG. 2 shows a front view of a split-phase UPS system 100 in accordance with one embodiment of the present invention and FIG. 3 shows a functional interconnect diagram of the UPS system 100. The UPS system 100 includes a number of components housed within a chassis 102. The primary components of the UPS system include power modules 104, battery modules 106, an AC distribution module 108, a communications module 110, a display module 112, a main intelligence module (MIM) 114A, and a redundant intelligence module (RIM) 114B. The communications module is not visible in FIG. 2, but in one embodiment the communications module is disposed in the frame behind the MIM 114A and the RIM 114B. The rear of the frame includes a backplane having blind-mating connectors that are used to interconnect the modules of the UPS system. The UPS system 100 is shown in FIG. 2 without a front door, however, in other embodiments, one or more covers may be placed over the front of the frame for aesthetic purposes, to protect the equipment, and to properly direct air flow.

The UPS 100 of FIGS. 2 and 3 includes five power modules 104 and four battery modules. The particular number of power modules and battery modules used in a particular application is selectable by the user depending on power and backup time required. In other embodiments of the invention, the frame may include additional slots to accommodate more power modules and battery modules. Further, a modular frame system that provides for additional power modules and battery modules may also be used with embodiments of the present invention. One such modular frame system is described in co-pending U.S. patent application Ser. No. 10/763,813, entitled "MODULAR UPS" filed on the same day as the present application and incorporated herein by reference.

The interconnection and operation of the UPS system 100 will now be further described with reference to the block diagram of FIG. 3. AC power for the UPS system is received at input terminals 120. The input terminals are mounted to the backplane and accessible through the rear of the frame. In the embodiment of the invention shown in FIG. 3, the UPS system is configured as a split-phase system having four input terminals 121, 123, 125 and 127 to respectively receive input phase one (AC_IN1) input phase two (AC_IN2) neutral (N, designated as MID in the UPS 100) and chassis ground. The system also has four output terminals 129, 131, 133 and 135 to provide, output phase one, output phase two, neutral and chassis ground. Embodiments of the present invention are not limited to split-phase systems, but rather, particular embodiments may be implemented as single phase systems as well as three-phase systems.

The input power passes from the input terminals to the AC module 108 and is passed through circuit breakers 122 and a filter board 124. The input power from the filter board is coupled to the power modules 104 through the backplane of the UPS, and is also coupled to a bypass switch 126 and to bypass relays 128 and 130 located in the AC module.

The bypass switch 126 allows a user, during maintenance of the UPS, to manually bypass the circuitry contained within the UPS to provide the input power at the input terminals directly to the output terminals of the UPS. The bypass relays 128 and 130 are controlled by either the MIM 114A or the RIM 114B and are used to couple the output of the UPS to either the input terminals or to the output of the power modules. In normal operation, the bypass relays 128 and 130 are configured to provide output power from the power modules, but if a failure or overload condition is detected, the relays are switched automatically to provide the output power directly from the input terminals.

Each of the battery modules is coupled to a positive DC bus (+ BATT) 132 and to the MID bus 134 to provide backup DC power to the power modules. The DC bus is also coupled to an external battery connector 136 to receive DC power from external batteries. Each of the battery modules is also coupled to the MIM and RIM through control and monitoring lines 138. In one embodiment of the present invention, the battery modules may be implemented using intelligent battery modules, such as those described in co-pending U.S. patent application Ser. No. 10/764,343, entitled "METHOD AND APPARATUS FOR MONITORING ENERGY STORAGE DEVICES" filed on the same day as the present application, and incorporated by reference herein. In other embodiments, the battery modules may be implemented using Symmetra and Symmetra RM battery modules available from American Power Conversion Corporation of West Kingston, R.I. under part numbers SYBATT, SYBT2 and SYBT3.

Figure 4:
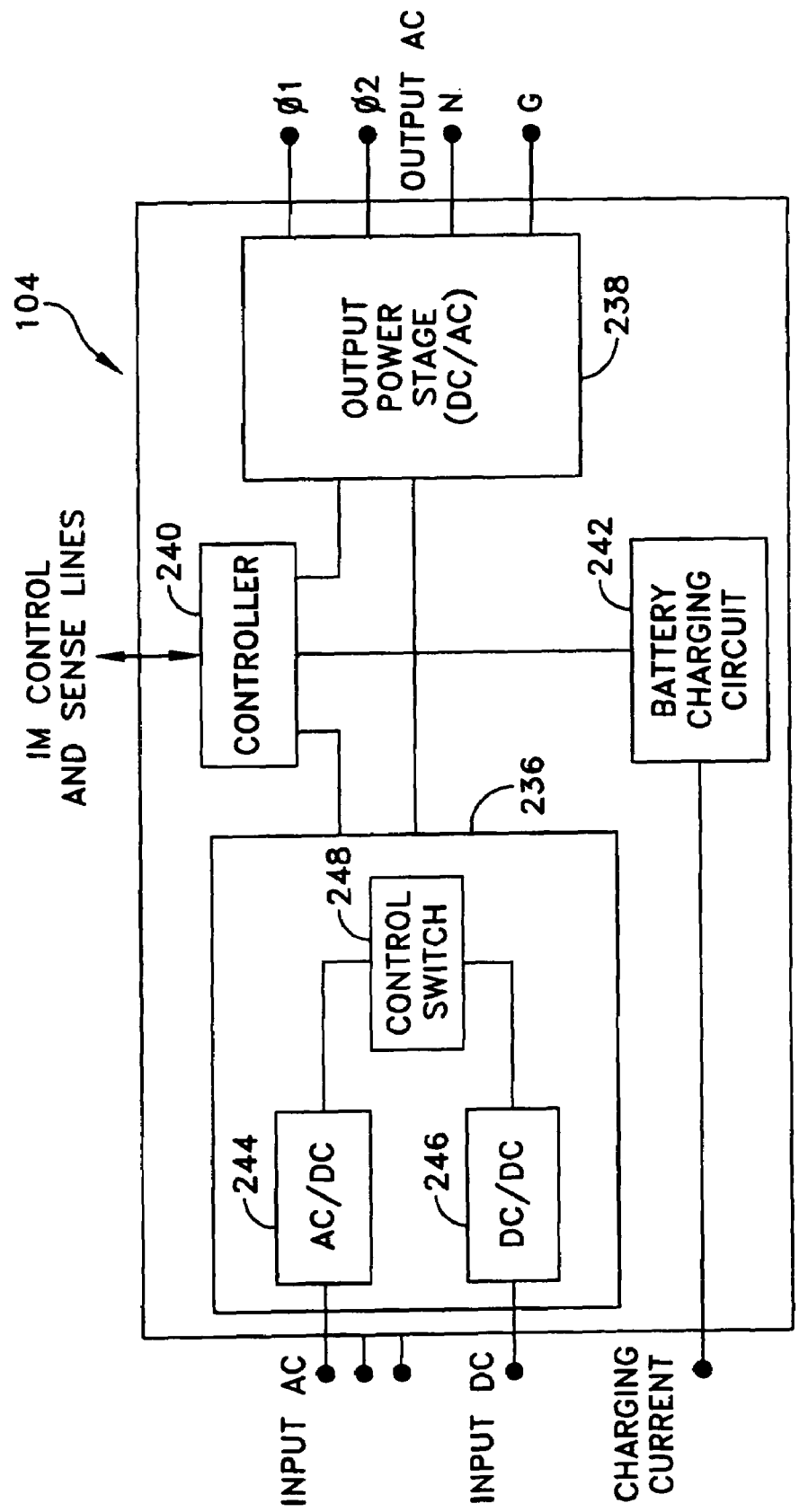
FIG. 4 is a functional block diagram of a power module used in the UPS system of FIG. 2.

The power modules 104 in one embodiment, are substantially identical, and each performs the functions of an uninterruptible power supply (without the battery) under the control of the MIM or the RIM. A functional block diagram of the power module 104 showing the major functional blocks and interconnections of one of the power modules is shown in FIG. 4. The power module 104 includes an input power stage 236, an output power stage 238, a controller 240 and a battery charging circuit 242. The input power stage 236 includes an AC/DC converter 244, a DC/DC converter 246 and a control switch 248.

The AC/DC converter 244 receives the input AC power and converts the input AC power to DC power. The DC/DC converter 246 receives the DC battery power and modifies the voltage level to produce DC power at substantially the same voltage level as that generated by the AC/DC converter. The control switch 248, under the control of the controller 240, selects either the DC power from the AC/DC converter or the DC power from the DC/DC converter as the input power to the output stage 238. The decision to switch to battery or line as the source power can be made individually by each power module. The output power stage 238 generates the output AC power from the DC power received from the input power stage. The battery charger circuit 242 generates charge current using the DC power from the AC/DC converter to charge the battery modules 106. The controller 240 controls operation of the input power stage, the output power stage and the battery charging circuit. In addition, the controller 240 provides the primary interface in the power module to the MIM 114A and the RIM 114B.

The power module shown in FIG. 4 is configured as a split-phase unit that receives input power having two phases and a neutral and provides two phases and a neutral at the output. In other embodiments, the input of the power module, the output of the power module, or both may be configured for single phase operation.

The communications module 110 provides the interface between either the MIM or the RIM and a number of components including external monitoring devices, accessory cards, and the display module 112. In one embodiment, the accessory cards can be implemented using SmartSlot cards available from American Power Conversion Corporation, of West Kingston, R.I. The communications module also provides the interface between the MIM or the RIM and an external battery controller used to control and monitor external batteries.

The display module 112 provides the primary user interface to the UPS system 100. As discussed above, the display module communicates through the communications module to either the MIM or the RIM. In one embodiment, the display module includes a 4×20 line alphanumeric LCD screen with five keys, LED indicators and an audible alarm. The LCD screen is used to display system status, fault reports and module diagnostic information, and provides the ability to control and configure the UPS.

The MIM 114A and the RIM 114B provide control of the UPS system 100. The main intelligence module provides primary control with the redundant intelligence module providing control when a fault occurs in the main intelligence module. In one embodiment of the present invention, the MIM and RIM are identical modules, with the designation of main intelligence module or redundant intelligence module being determined by the location in the UPS frame rather than by any differences in the modules themselves. In the description herein, references to an intelligence module use the reference numeral 114, while references to an intelligence module loaded in the MIM slot use the reference numeral 114A and references to intelligence modules in the RIM slot use the reference numeral 114B. Each of the modules includes hardware, software and firmware that enables it to operate as either a MIM or a RIM. In the embodiment shown in FIG. 2, the intelligence module loaded in the lower intelligence module slot is designated as the main intelligence module, and the intelligence module loaded in the upper slot is designated as the redundant intelligence module. The intelligence modules have an input designation pin that mates with a connector in the frame to determine which of the two slots they are mounted in and whether they should function as a MIM or a RIM.

The operation of the MIM and RIM in embodiments of the present invention to control operation of the UPS 100 will now be described with reference to FIG. 5 which shows a functional block diagram of the intelligence modules with one of the modules functioning as the MIM 114A and the other of the intelligence modules functioning as a RIM 114B. The MIM is responsible for control of the other modules in the UPS system 100, and as shown in FIG. 3, the MIM and the RIM are coupled by control/communication bus 138 to the battery modules, the power modules, the AC module, the communications module as well as to cooling fans. One control/communication bus 138 is shown in FIG. 3, but as described below, in particular embodiments of the present invention, the MIM and the RIM may use a number of different control lines and buses to implement the control/communications bus 138 to perform all of the supervisory tasks of the MIM and the RIM.

Figure 5:
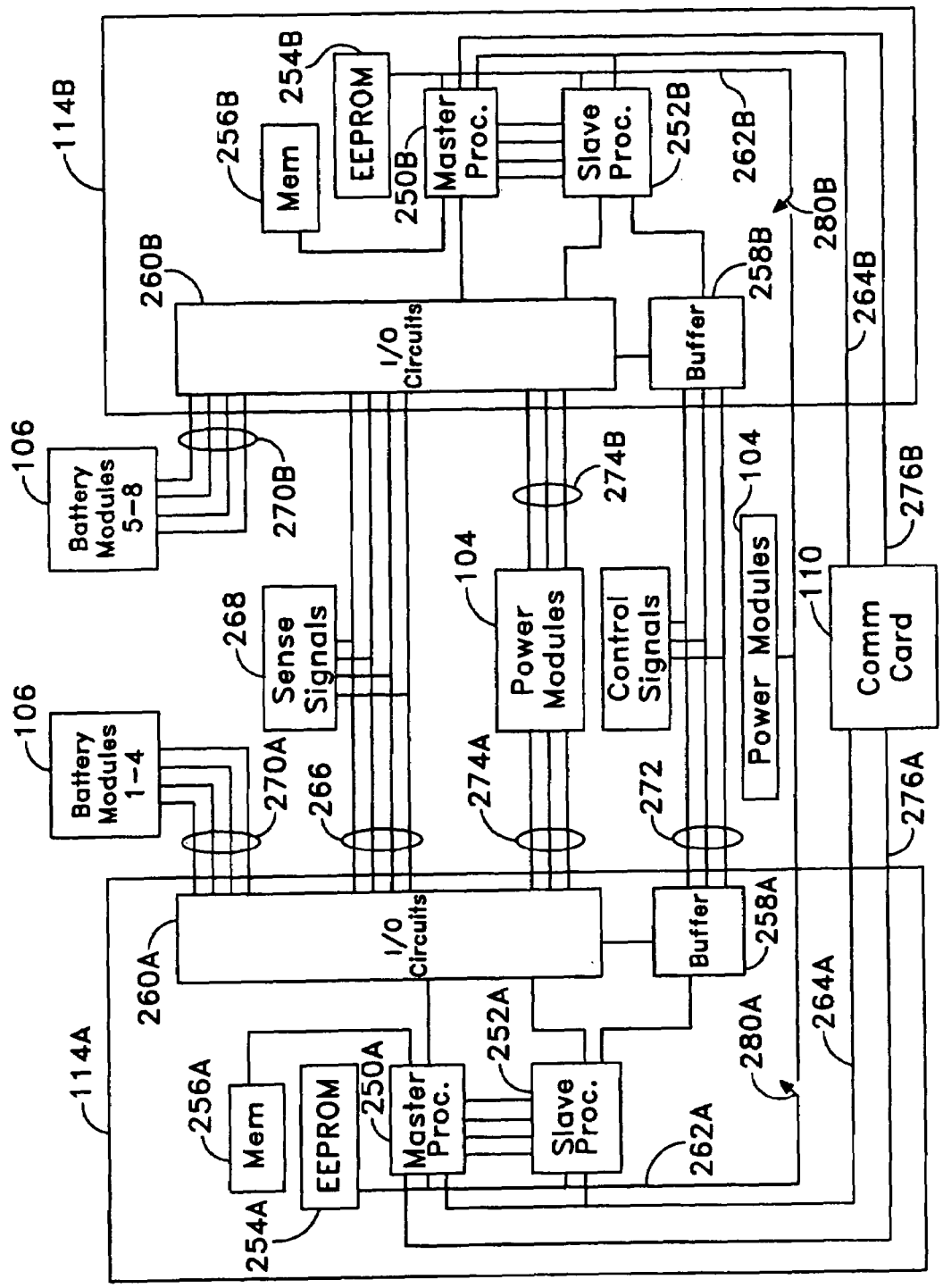
FIG. 5 is a functional interconnect block diagram of the main intelligence module and the redundant intelligence module of the UPS system of FIG. 2.

The MIM and the RIM may be implemented using identical intelligence modules and in FIG. 5, the common elements of the MIM and RIM are designated using the same reference numerals with the MIM elements including an "A" suffix and the RIM elements including a "B" suffix. The intelligence modules include a master processor 250A, 250B, a slave processor 252A, 252B, an EEPROM 254A, 254B, memory 256A, 256B, control buffer circuitry 258A, 258B, analog input/output measurement circuitry (I/O circuitry) 260A, 260B, internal control lines between the components of the intelligence modules and external control/sense/communications lines that couple to modules external to the intelligence modules. An internal IIC bus 262A, 262B is coupled between the processors and EEPROMs in both intelligence modules and is also coupled to the power modules. An external IIC bus 264A, 264B is coupled to each of the master processors and is also coupled to the communications module 110. In the functional block diagram of FIG. 5 to avoid unnecessary complexity, the total number of connection lines in the drawing is not representative of the number of physical connections between each of the elements, but rather functional connectivity is shown.

In one embodiment of the present invention, the master processors are implemented using 16 MHz, XA-S3 microcontrollers, having part no. PXAS30 KBA, available from Philips Semiconductors. The slave processors are implemented using a 20 MHz Microchip PIC 17C56A controller available from Microchip Technology, and the EEPROMS are implemented using part no. 24LC64, 8K×8 available from Microchip Technology. In addition, the memory modules are implemented using Silicon Storage Technology SST28SF040A 512K×8 Flash and Samsung K6T1008C2E-TB70 128 K×8 Static RAM.

The master processor in the MIM functions in the UPS 100 as the central processor of a distributed system architecture. The master processor communicates and controls distributed processors via IIC bus links and direct hardware status control lines. The distributed processors include the slave processor in the MIM, the master and slave processors in the RIM, and processors included in the controllers of the power modules. In one embodiment, the processors in the controllers of the power modules are implemented using the same Microchip processors used for the slave processors in the MIM. The master processor in the MIM can also communicate with a processor contained in an external battery frame over the external IIC bus.

Within the MIM, the master processor provides primary control of the slave processor and provides control, monitoring and status reporting of functions which are not time critical to the UPS system, including reporting status through the communications module to the display module and to any external devices coupled to the communications module. The master processor in the MIM also functions as the master of the internal IIC bus and the external IIC bus, and is responsible for maintaining the status of the settings of the UPS in the EEPROM 254A and in the memory 256A.

The slave processor in the MIM 252A is used to control and monitor the more time critical functions within the UPS system 100. The slave processor 252A regulates the output voltage, frequency and phase; monitors the input voltage, frequency and phase; monitors battery voltage and provides bypass control. The slave processor also provides data regarding the operation of the UPS to the master processor in the MIM. In addition, when intelligent battery modules are used, the slave processor in the MIM communicates with half of the battery modules, while the slave processor in the RIM communicates with the other half of the battery modules.

The master processor 252A in the RIM provides essentially the same functionality as the master processor in the MIM with the exception that the master processor in the RIM does not act as bus manager of the internal and external IIC buses unless there is a failure of the MIM and control is passed to the RIM. Also, as described below, control signals from the RIM to the communications module are only acted on by the communications module if the RIM is in control.

The slave processor 254B in the RIM provides essentially the same functionality as the slave processor in the MIM. The slave processor 254B monitors the status of the UPS, provides control signals to modules in the UPS 100 and provides data to the master processor in the RIM. As described below, the control signals generated by the slave processor in the RIM are only acted upon when the RIM is in control.

For discussion purposes, the functions of the MIM and RIM and the control and communications signals from the MIM and RIM can be grouped in to the following functional groups, status monitoring of UPS operational parameters, battery module sensing and communication, digital control signaling by the MIM and RIM, communication between the MIM and RIM and power modules; communication between the MIM and RIM and the communications card; communication between the MIM/RIM and an external battery processor; and direct communication between the MIM and the RIM. In embodiments of the present invention, control schemes have been implemented to allow the MIM to perform the functions listed above and to provide smooth transition to a second identical RIM upon failure of the MIM.

In the block diagram of FIG. 5, four status monitoring lines 266 are shown coupled to the MIM and the RIM and to a functional block identified as UPS sense and monitoring circuits 268. The control lines 266 are coupled to the I/O circuitry 260A and 260B in the MIM and RIM and allow the MIM and RIM to simultaneously sense and measure various UPS parameters in embodiments of the invention. These parameters include input and output power, current, voltage, frequency and phase, internal temperatures, and battery bus voltage. In addition, status monitoring lines 266 are used to monitor fan operation, circuit breakers, and the positioning of the bypass switches and relays. From the sense data received over the sense lines 266, circuits within the I/O circuitry 260A and 260B condition the signals and send them to the slave processors 252A and 252B or the master processors 250A and 250B for processing. In this manner, both the MIM and the RIM independently monitor the present status and operational state of the UPS 100.

In one embodiment of the present invention, the UPS 100 can support up to sixteen internal battery modules. In this embodiment, eight of the battery modules communicate with the MIM over communication lines 270A and eight communicate with the RIM over communication lines 270B. The battery voltage is measured using the status monitoring lines 266 described above, and communication lines 270A and 270B are used to obtain additional battery module information, and in one embodiment, usable with intelligent battery modules, the communication lines 270A and 270B are used to provide a DC voltage to the battery modules and to communicate data to the battery modules. Data regarding the battery modules is communicated between the MIM and the RIM over the IIC bus 262A, 262B.

The slave processors 252A and 252B provide digital control signals identified in FIG. 5 as control lines 272 to control the operation of a number of functions within the UPS. These operations include control of the bypass relays and powering on and off of the power modules. These control signals are generated independently by the slave processors in the MIM and RIM, and in one embodiment of the present invention, the buffer circuits 258A and 258B are used to allow only the control signals from one of the MIM and RIM to pass to the module that is being controlled. In addition, in one embodiment, an additional cold start control signal, generated by the master processor to enable the UPS to cold start from power in the battery modules, is also provided by the buffer circuits 258A and 258B.

Each of the buffer circuits 258A, 258B is configured to receive enabling signals from the intelligence module in which it resides as well as from the other intelligence module and to determine whether or not to send the control signals. If the buffer circuit is in the MIM, and the MIM is operational, then the output of the buffer circuit is enabled. If the buffer circuit is in the MIM, and the MIM is not fully operational, the output is not enabled. If the buffer circuit is in the RIM, and the MIM is operational, then the output is not enabled, and if the buffer circuit is in the RIM, and the MIM is not operational, then the output is enabled.

In one embodiment, each buffer circuit has two enable inputs, the status of which is used to enable the outputs for the control lines. One of the enable inputs is coupled to an output of the buffer circuit in the other intelligence module, and the other enable input is coupled to a module status signal within the intelligence module that contains the buffer. The module status signal if "true" indicates that the intelligence module is "ok". The buffers are configured to enable the output, if the module status signal is received (and is "true") before the control signal from the other buffer is received.

Upon initial startup, both intelligence modules determine whether they are located in the MIM slot or the RIM slot. If the intelligence module is located in the MIM slot, and the module is "ok", then the module status signal is set to "true" with little or no delay. If the intelligence module is located in the RIM slot, and the module is "ok" then the module status signal is set to "true" after a delay of approximately one second. The delay is set to be long enough to ensure that the control signal from the buffer in the MIM is received by the buffer in the RIM before the module status signal in the RIM to place the MIM in control. If the MIM is not fully operational, then the buffer in the RIM will receive its module status signal prior to receiving a signal from the MIM and the buffer in the RIM will enable its outputs. If during the operation of the UPS 100, there is a fault in the MIM, then the module status signal will no longer be "ok", and control of the control signals will shift to the RIM.

In addition to the control signals described above, the slave processors in the MIM and the RIM provide control signals 274A and 274B through the I/O circuitry 260A, 260B to the power modules to provide control of the magnitude, frequency and phase of the output power of the power modules. Each of the MIM and the RIM provide control signals to control the output power of the power modules, and each also provides a status signal indicating whether or not the intelligence module is "ok". If the MIM status is "ok", then the power modules will use the MIM control signals to control the output power. If the MIM status signal is not "ok" and the RIM status signal is "ok", then the power modules will use the RIM control signals. If both status signals are not "ok", then the power modules will default to attempt to use the MIM control signals.

In one embodiment of the present invention, external communication with the MIM and the RIM is via the communications card 110 is provided in an RS-232 format over lines 276A and 276B. Each of the master processors in the MIM and the RIM independently attempts to communicate with devices through the communications card. In one embodiment of the present invention, the communications card is configured to receive a status signal from the MIM that indicates whether the MIM is "ok". If the MIM is "ok", then the communications module only forwards communication from the MIM to modules coupled to the communications card. If the MIM is not "ok", then the communications module forwards the RIM communications. Data from the display and any other modules to the communications card are sent to both the MIM and the RIM, allowing both to monitor status and receive user settings through the communications module.

As discussed above, the MIM 114A and the RIM 114B contain two IIC buses 262A, 262B and 264A, 264B. The IIC buses are two-wire serial buses implemented in accordance with the industry standard developed by Phillips Semiconductor. The internal IIC bus 262A, 262B is used for communication between the processors in the MIM and the RIM, the EEPROMs in the MIM and the RIM, and the processors in the power modules. The master processor in the MIM functions as the bus master for both IIC buses, and the master processor in the RIM assumes control as master of the buses upon failure of the MIM. The internal IIC bus is used by the master processor in the MIM to communicate and collect status information with each of the other processors. Also, the master processor in the MIM communicates with its EEPROM to store and obtain status information and settings of the UPS 100.

In one embodiment of the present invention, relays 280A and 280B are installed in the internal IIC bus in the intelligence modules. Each relay is controlled by the master processor in the intelligence module containing the relay. The relay is used to disconnect the internal IIC bus from components outside the intelligence module, and the relay allows a master processor in an intelligence module located in a RIM slot to communicate with the EEPROM located in the RIM or to perform a diagnostic self test of its own IIC bus and devices. As discussed above, this implementation of IIC has only one master that can control communications on the bus, and the master processor in a functioning MIM acts as the bus master. In the RIM, the master processor 250B can communicate with the EEPROM 254B or perform a IIC self test by opening the relay 280B, asserting itself as the master of the IIC bus within the RIM 114A and then communicating over the IIC bus 262A. Once communications are complete, the master processor 250B closes the relay.

The external IIC bus 264A, 264B is used to allow the master processor in either the MIM or the RIM to communicate with a processor located in an external battery frame. The communications module includes a switch that couples an external IIC bus to either the MIM external IIC bus 264A or to the RIM external IIC bus 264B. The status of the switch is determined by the MIM status signal sent from the MIM to the communications module discussed above. The switch in the communications module allows either the master processor in the MIM or the RIM, depending on the operational state of the intelligence module functioning as the MIM, to be the bus master for the external IIC bus.

As discussed above, a number of different control schemes are used to allow both the MIM and the RIM to monitor the state of the UPS, to allow only the appropriate one of the MIM and RIM to control the UPS, and to allow both the MIM and the RIM to receive user commands from either the display module or an external device communicating with the UPS through the communications module. In embodiments of the present invention, the MIM and RIM communicate with each other to monitor the status of each other and to provide UPS data to each other.

In each of the intelligence modules 114A, 114B, the EEPROMs are used to store UPS settings and parameters and the master processors in each module access the EEPROMs to obtain this information upon initial startup. In embodiments of the present invention, the EEPROMs may be used to store system runtime data, user output power settings, hardware calibration constants, user password information, and other user default settings.

Each intelligence module also includes RAM memory 256A, 256B. The RAM memory is used to store operational settings obtained from the EEPROM and current data regarding the operation of the UPS including data obtained from the various sense lines and data calculated by the slave processor and the master processor. In one embodiment of the present invention, the RAM memory in each intelligence module contains two sets of data, one set provided by the master processor in the same intelligence module, and one set provided by the master processor in the other intelligence module in the UPS. As discussed above, each of the MIM and the RIM are coupled to the UPS sense lines, and accordingly, can independently determine status of the UPS. The use of two sets of data allows the MIM and the RIM to compare the data and alert the user of a possible fault if there are significant differences in the two sets of data.

The internal IIC bus is also used to ensure that the data stored in the EEPROMs 256A and 256B remain synchronized when user configuration data is changed. Each of the MIM and the RIM receive update information from users from the communications module, and in one embodiment, use this information to update the data in the EEPROMs whenever a change in the user configuration settings occurs. In this embodiment, to ensure that the EEPROMs data are the same, only the update data from the MIM is used to update both the EEPROM 254A in the MIM and the EEPROM 254B in the RIM. In one embodiment, the master processor 250A in the MIM accesses the EEPROM 254B in the RIM over the internal IIC bus to provide updates to the EEPROM 254B.

In still another embodiment, to prevent a faulty MIM from writing bad data to EEPROM 254B, the EEPROM 254B is write protected to prevent the MIM from directly writing data to the RIM's EEPROM 254B. When the master processor 250 in the MIM receives updated data for the EEPROM 254B of the RIM, the master processor 250 sends the data to the master processor 250B in the RIM over the internal IIC bus 262A, 262B. The master processor 250B RIM then opens relay 280B to isolate IIC bus 262B from IIC bus 262A to allow the master processor 250B to function as the bus master and write to the EEPROM 254B. Once the writing of data to the EEPROM 254B is completed, the relay 280B is closed, and the master processor 250A again becomes bus master of the combined IIC bus 262A, 262B.

Upon initial startup and during operation of the UPS, a number of procedures are followed to ensure that the intelligence modules in the MIM and RIM slots in the frame perform the functions of the MIM and RIM described above, and to ensure that control of the UPS 100 is passed from the MIM to the RIM smoothly when there is a failure of the MIM. Control signals 272 coupled between the MIM and the RIM are used to establish and pass control of the UPS between the MIM and the RIM. Identification of these signals and a description of the function of the signals is provided in Table I below.

TABLE I

MIM/RIM Control Signals

| Signal Name | Function in MIM | Function in RIM |
|---|---|---|
| IM0_1 | Coupled to ground point in frame to indicate that the module is installed in the MIM slot | No connection to indicate that module is installed in the RIM slot |
| LPON | Coupled to LPON in RIM and power modules, used to start MIM and RIM in cold start from battery. | Coupled to LPON in MIM and power modules, used to start MIM and RIM in cold start from battery. |
| MIM_OUT | Connected to ENABLE_IM input in RIM. | Connected to ENABLE_IM input in MIM. |
| IM_OK | Connected to MOD_OK input of RIM to provide indication that MIM is "ok" | Connected to MOD_OK input of MIM to provide indication that RIM is "ok" |
| IM_PRES | Coupled to MP_IN in RIM to indicate that a module is present in the MIM slot | Coupled to MP_IN in MIM to indicate that a module is present in the RIM slot |

Upon initial startup of the UPS system 100, the intelligence modules determine which slot in a UPS frame that they are located based on the state of signal IM0_1. Initially, the relays 280A and 280B are in the open position to prevent IIC communication until the operational status of the MIM and the RIM is determined.

The intelligence modules undergo a self-check procedure, and if successful, each module will set the IM_OK signal to "true", and provide the control signals to the communication module and the power modules to indicate that the MIM is operational and in control. In addition, the buffer 258A in the MIM will have its output enabled as described above, to provide control signals from buffer 258A and to disable the output of the buffer 258B in the RIM. While relays 280A and 280B are open, the master processors 250A and 250B read their associated EEPROM 254A, 254B to obtain the configuration information for the UPS 100. The relays are then closed, and the master processor in the MIM becomes the bus master for the internal IIC bus 262A, 262B.

If a failure occurs in the MIM during initial startup, then the RIM will not receive the IM_OK signal from the MIM, and the RIM will be in control of the UPS 100. In this condition, the master processor 250B functions as the bus master for the internal IIC bus, and the communication module and the power modules are responsive to signals received from the RIM. In addition, buffer 258B will have its output enabled to provide control signals from the RIM.

During operation of the UPS, the slave processors in the MIM and the RIM continuously perform a ping pong operation with the master processors to monitor the health of the processors. In one embodiment, this process consists of the master processor sending a "0" to the slave processor, with the slave processor responding with a "0". The master processor then sends a "1" with the slave processor responding with a "1", and this process continues with the master processor changing state and the slave processor following the input state. If either the master processor or the slave processor detects an error in this process, then a fault is detected, and the IM_OK line is set to false. Also the control signal to the power modules is changed to indicate a failure of the intelligence module, and if the failed intelligence module is the MIM, the status control signal to the communications module will also be set to false.

If a failure of the MIM occurs, then the RIM detects this failure when the IM_OK line goes false, and the RIM takes over the functions of the MIM in a manner similar to that which occurs at startup described above. When the failed intelligence module in the MIM slot is replaced with a functioning intelligence module, then it will send a request to the RIM over the IIC bus to assume control of the UPS. After receiving the request, the intelligence module in the RIM slot will relinquish control, and once the intelligence module in the MIM sees that control has been relinquished, it will assert the control signals to the power modules and the communications module to fully resume control of the UPS.

In one embodiment of the UPS system 100, features which will now be described, are incorporated into the UPS to prevent drain of the batteries during a no-AC power down mode from which startup from batteries may be performed. In prior UPS systems, logic circuits typically continue to receive voltages from the batteries during no-AC power down mode to allow the circuits to detect a user request for a cold start. Also, in typical prior art UPS systems, resistance in capacitors and other devices remain across the batteries during power down mode, thereby allowing the batteries to slowly drain.

Figure 6:
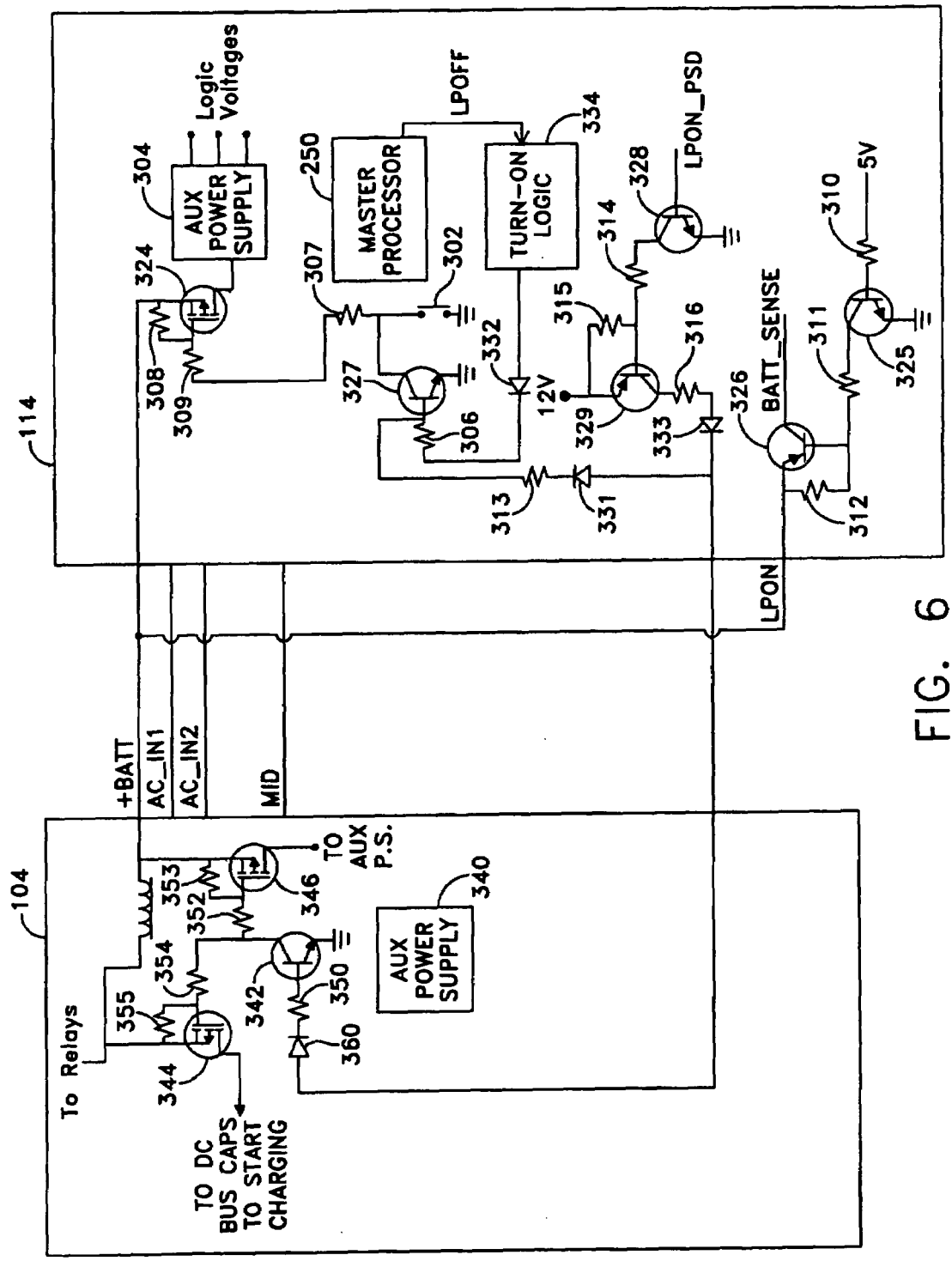
FIG. 6 is a functional diagram of cold start circuitry used in at least one embodiment.

In embodiments of UPS systems of the present invention, relays and semiconductor switches are used to isolate the batteries from any ohmic connections, including capacitors, and all logic circuits are powered down during no-AC power down mode to prevent the batteries from draining. To allow the UPS to be powered on during this mode, cold start circuits have been added to the power modules and the intelligence modules. FIG. 6 shows a functional diagram of the cold start circuitry and control signals implemented in the intelligence module 114 and the power module 104. As discussed above, in embodiments of the present invention, a common intelligence module is used for the MIM and the RIM, and the intelligence module shown in FIG. 6 is representative of the configuration used for an intelligence module 114 used as a RIM or a MIM.

The portions of the intelligence module shown in FIG. 6, include the master processor 250, a push button switch 302, an auxiliary power supply 304, resistors 306–316, transistors, 324–329, diodes 331, 332 and 333, and turn-on logic circuitry 334. In one embodiment, the push-button switch is located on the front of the intelligence module (both the MIM and the RIM), and is easily accessible by the user with the front door of the UPS 100 removed. The portions of the power module shown in FIG. 6 include an auxiliary power supply 340, transistors 342, 344, and 346, resistors 350–356 and a diode 360.

Cold start of the UPS 100 from battery begins with a user activating one of the push button switches 302 on the front of the MIM or the RIM. In one embodiment, to initiate cold-start, the operator keeps the button pressed for a period of approximately two seconds. The activation of the switch causes current to flow through the switch through resistors 307, 308 and 309 turning on transistor 324. When transistor 324 turns on, battery voltage is applied to the auxiliary power supply 304 which starts generating logic voltages for circuits in the intelligence module, including the master processor, which starts to run. Once the auxiliary supply is operating, 5 volts is applied to transistor 325 through resistor 310 turning on transistor 325, which turns on transistor 326 using bias resistors 311 and 312. When transistor 326 is turned on, then the battery sense signal is supplied to the master processor for sensing and processing. Transistors 325 and 326 isolate this sense signal in the power down mode.

The master processor applies a logic signal LPOFF to the turn on logic circuitry 334. In response to signal LPOFF, voltage is applied to transistor 327 through resistor 306 and diode 332 to turn transistor 327 on. When transistor 327 is turned on, then the voltage at the push button switch is pulled to ground, and it is at this point in time that the user can release the push button switch, since it is latched to ground.

The master processor detects that there is no AC present and that it must start from battery. The master processor then sets signal LPON_PSD high, which through transistors 328 and 329, resistors 314, 315 and 316, and diode 333 sets output signal LPON to 12 volts. Signal LPON is sent to each of the power modules and to the other intelligence module to inform each of these modules that a cold start from battery is to occur. In the intelligence modules, signal LPON is received or transmitted on the same pin depending on whether the particular intelligence module is the one whose push button was activated by the user. When the LPON signal is received by an intelligence module, the signal turns on transistor 327 through diode 331 and resistor 313. When transistor 327 is turned on, the intelligence module is powered on in the same manner as described above.

In the power modules, LPON is applied to transistor 342 through diode 360 and resistor 350 turning on transistor 342. The turn on of transistor 342, causes transistors 344 and 346, having biasing resistors 352, 353, 354 and 355, to turn on. Once transistors 344 and 346 turn on, battery voltage is applied to circuits in the power modules including the auxiliary power supply 340 and the processor in the power module, which can begin communications with the master processor in the MIM over the IIC bus.

The power down and cold start circuits described above provide significant advantages over typical prior art UPS systems. The use of relays and transistors to isolate resistive devices prevents drainage of batteries, and the use of the cold start circuitry in the manner described enables cold start from battery without the need to keep logic circuits powered, which would drain the batteries.

In yet another embodiment of the present invention, an input current management scheme is implemented in the UPS 100 to enable the UPS 100 to operate in a low input AC voltage mode without the need to switch to battery mode. As is well known, in typical electronic devices, including UPS's, when the input voltage available to the device decreases, typically because of input power problems, the current draw of the device increases to maintain input power at substantially the same level. If the current draw increases too much, then circuit breakers in the UPS or in the feed to the UPS may trip. In typical UPS's, the UPS will switch to battery mode, and turn off the input AC, if the input voltage decreases below a predetermined level. This results in the disadvantage of having to run on battery (with limited battery run time) when AC is available, but not at a high enough voltage level.

Figure 7:
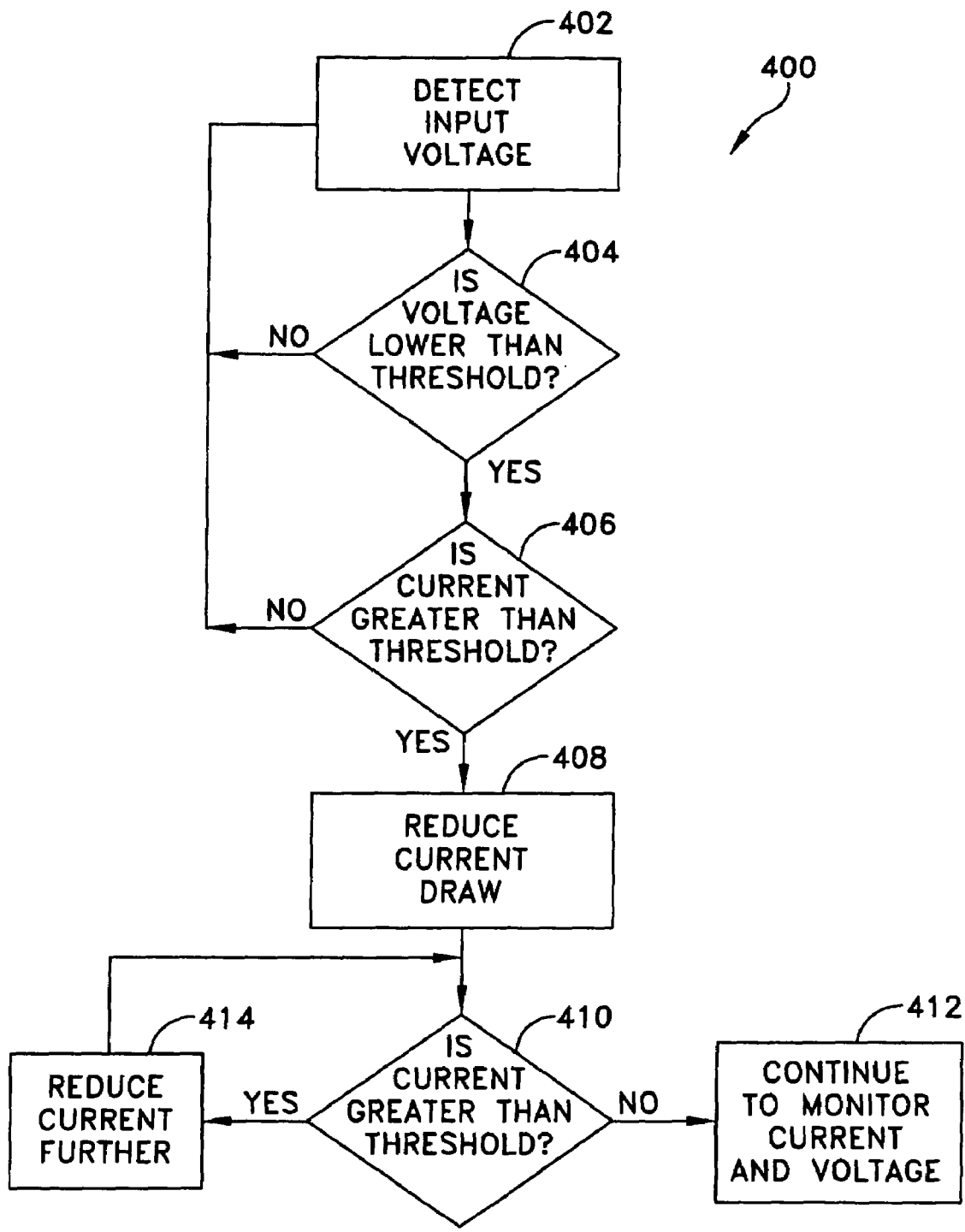
FIG. 7 is a flowchart of a procedure for limiting input current used in at least one embodiment.

In embodiments of the present invention, the intelligence modules are programmed to detect a low input voltage (resulting in high input current) condition, and to reduce the total power draw of the UPS to enable the UPS to operate with low input voltage without worry of tripping circuit breakers. A procedure used to perform this function in one embodiment of the present invention will now be described with reference to FIG. 7, which shows a flow chart of the current reduction process 400. At point 402 in the process, the input voltage is detected by the slave processor in the MIM (or the RIM if the MIM is not functioning) and forwarded to the master processor. At decision block 404, the input voltage is compared with a predetermined threshold. If the input voltage is greater than the threshold, then process 400 returns to point 402.

If the input voltage is less than the threshold, than the process proceeds to point 406 where the input current is measured and compared with a predetermined current threshold level. If the current is less than the threshold, then the process returns to point 402. If the current is greater than the threshold than the process proceeds to point 408, where a current reduction scheme is implemented. In one embodiment of the invention, to reduce input current, the master processor in the intelligence module in control sends a command to the controllers in the power modules to reduce the charge current to the batteries. The amount of the reduction can be a fixed value or can be determined based on the magnitude of the current at the input of the UPS 100. Also in different embodiments, the charge current can be reduced to zero for some or all of the power modules if the current at the input is excessively high.

After the current reduction scheme is implemented at point 408, the process proceeds to point 410, where the current is again determined and compared to the threshold, to determine whether a further reduction in current is required. If the outcome of decision block 410 is "YES", then the process moves to point 414 for further reduction of input current. If the outcome of decision block 410 is no, then the process proceeds to point 412 where the input voltage and current is monitored for any changes that would require further reduction of current or allow the UPS to draw additional current.

In the current reduction schemes of the invention described above, charging current to the battery modules is reduced to allow the UPS to operate at low line voltage. In other embodiments, other non-critical operations in the UPS may be shut down or scaled back to reduce the input current to the UPS.

As discussed above, the UPS 100 may be a split-phase UPS that can be powered using two input phases of an input power system, and can provide two output phases. For North American applications, where the output voltage is set for 208V (phase to phase), the input phases are typically offset by 120 degrees with one of the phase lines leading the other. In split-phase UPS systems, it is desirable to provide output phasing that matches the input phasing to provide smooth transfer of power to the load when the UPS bypass switch is activated. In typical UPS systems, the matching of the phase lines is accomplished manually by an electrician at the time of installation.

In one embodiment of a UPS system of the present invention, which will now be described, the matching of the phase lines is accomplished by the UPS system itself. As discussed above, sense lines are coupled from the I/O circuitry 260A, 260B in the MIM and the RIM to the input power lines (see, FIG. 5). In one embodiment, the I/O circuitry includes a zero-crossing detection circuit that is used in conjunction with the slave processors to measure the raw phase angle between the input phases. The actual stable phase angle is determined by the master processors in the MIM and the RIM. The master processor in the MIM (if the MIM is operating and in control) uses the IIC bus to collect the raw phase angle data from the MIM slave processor. Also, the master processor in the MIM transfers the raw phase angle data from the slave processor in the MIM to the master processor in the RIM over the IIC bus. If the intelligence module in the MIM slot is not functioning, then the master processor of the intelligence module in the RIM slot will be the bus master, and will transfer the raw phase angle data from the RIM slave processor to the RIM master processor.

The master processors receive the raw phase angle data every 500 milliseconds until ten valid readings occur. A reading is considered valid if an internal phase lock loop has settled and the value of the detected angle is either 120 degrees, 180 degrees, or −120 degrees plus or minus approximately 22 degrees. Three successive invalid readings will reset the valid reading count to zero. The master processor calculates the actual phase angle between the input phases as the average of the ten raw readings. Each master processor communicates its calculated phase angle to its associated slave processor. The slave processors provide control signals to the power modules to control the power modules to generate output voltages having phasing that matches the input. The use of automatic phase detection eliminates the need in prior art systems to use an electrician to provide matching using trial and error.

As discussed above, in the UPS 100, upon failure of components in the UPS that would prevent the UPS from providing the specified output power, bypass relays can be activated to directly connect the input of the UPS to the output of the UPS, thereby bypassing the UPS. In typical UPS systems, a hardware implemented window comparator is used to compare the output voltage waveform with upper and lower threshold limits that define an acceptable output voltage window. For UPS systems that are configurable to operate with multiple output voltages, hardware settings, jumpers, components or boards are changed to adjust the window comparator when the output voltage settings are changed.

In at least one embodiment of the present invention, a window comparator is implemented in software in the intelligence modules of the UPS 100. By implementing the window comparator in software, threshold limits can be defined programmatically and corrected using calibration constants stored in the EEPROMs 254A, 254B by the intelligence modules master processors. In addition to a simple voltage comparison against upper and lower threshold limits, a more comprehensive model is used which provides a more selective and intelligent comparison. In one embodiment of the invention, programmable thresholds include the values identified in Table 2.

TABLE 2

Window Comparator Stored Values

| Value Name | Value Description |
| --- | --- |
| Turbo_Delta | Equal to half the width of the acceptable threshold window. |
| TurboScaleFactor1 | A scaling factor that when multiplied by a sin reference produces the expected output voltage at phase 1 for comparison with the measured voltage. |
| TurboScaleFactor2 | A scaling factor that when multiplied by a sin reference produces the expected output voltage at phase 2 for comparison with the measured voltage. |
| Turbo_drop_count | Equal to the number of consecutive out of tolerance readings that result in an out of tolerance signal being sent to the master processor. |
| Turbo_band_short_Ckt | A short circuit voltage level below which a short circuit may be present. |
| Turbo_Band_Short_Cht | If this value is exceeded and the voltage is less than Turbo_band_short_Ckt, then the system will detect that a short circuit is present at the output of the UPS. |

Figure 8:
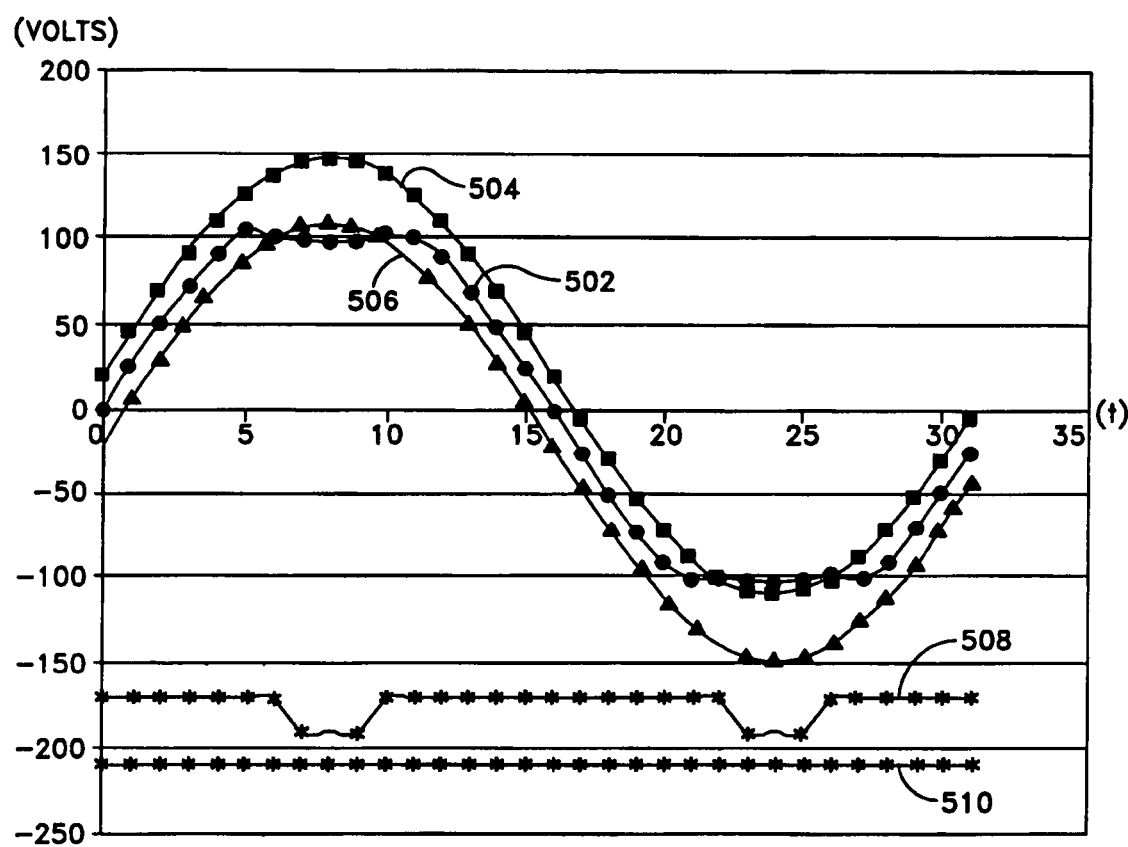
FIG. 8 is a graph of output voltage and voltage thresholds for one embodiment.

The software implemented window comparator of the UPS 100 operates as follows. As discussed above, output voltage and current values of the UPS are sensed by the slave processors of the intelligence modules. Based on programmable thresholds received from the master processor (Table 2), the slave processors establish upper and lower voltage threshold levels and compare the output voltage waveform with the thresholds. FIG. 8 shows a plot of output voltage 502 along with an upper threshold 504 and a lower threshold 506. In one embodiment, output voltage measurements are performed thirty-two times per line cycle. Each slave processor compares the detected output voltage waveform with the thresholds and generates a signal 508, identified as Turbo_raw, also shown in FIG. 8, that changes state when the output voltage is lower than the lower threshold or greater than the upper threshold.

Also shown in FIG. 8 is a delayed signal 510, identified as Turbo_Out. The Turbo_Out signal is based on the Turbo_raw signal and the value of Turbo_drop_count. The Turbo_Out signal only changes state if the Turbo_raw signal remains low for a number of readings greater than or equal to the Turbo_drop_count. The use of the delayed signal prevents the UPS 100 from shutting down due to short transients in the output voltage. In one embodiment of the invention, to implement the delay, a counter increases its count by one at each measurement point that the measured signal is outside its window and decreases its count by one each time the measurement signal is within the window, without going below zero or greater than the value of Turbo_drop_count. The use of this counter will cause the Turbo_Out signal to detect a recurring transient situation at the output. Whenever the count is equal to the Turbo_drop_count, then the Turbo Out signal is activated, indicating to the master processor that the voltage is out of tolerance, and the master processor can activate the bypass relays to couple the input of the UPS directly to the output. In one embodiment of the invention, directed to a UPS that is a split phase system, the voltage on both output phases are monitored using the process described above.

The use of software adjustable parameters for determining out of tolerance conditions on the output of the UPS discussed above provides several advantages, including the ability to change output voltages without changing jumpers or other hardware, and the ability to adjust thresholds and filtering parameters for transients in a real-time manner to allow the UPS to operate more effectively in areas having unreliable power characteristics and to correct thresholds using calibration constants stored in EEPROM. Also, as will now be described, the use of the programmable voltage/phase window comparator allows embodiments of the invention to provide an improved output short circuit detection and shut down system.

In a typical UPS system, when a short circuit occurs at the output, a voltage drop will be detected at the output, and the system will be switched to bypass mode, potentially placing the short circuit across the input power lines. The short circuit may then cause a large current surge, which will cause circuit breakers in the facility to trip, shutting down the UPS and possibly other equipment in the facility as well.

In at least one embodiment of the UPS system 100, short circuit detection and protection is provided. As discussed above, the state of the Turbo_raw signal is changed when an out of threshold output voltage is detected. In this embodiment, when the Turbo_raw signal goes low, the value of the output voltage is compared with the value of Turbo_Band_Short_Ckt (see Table 2) to determine if the output voltage is lower than the output short circuit voltage. In one embodiment, this voltage is set for approximately 8% of the desired output voltage. In a split phase system, the differences between the output voltages of the two phases are compared with the value of Turbo_Band_Short_Ckt. If the output voltage is lower than Turbo_Band_Short_Ckt, then the output current is compared with the value of Turbo_Band_Short_Cht to see if the output current is greater than that set for a short circuit. If the output current is greater than Turbo_Band_ Short_Cht, then the slave processor determines that a short circuit has occurred, and disables Turbo_Out before the delay period has elapsed to prevent the system from switching to bypass mode. To handle a short circuit, over current protection is provided in the inverters of the power modules, which are designed to provide current at a maximum current value for greater than a predetermined period, equal to four seconds in one embodiment. When a short circuit is detected, the slave processor will wait for four seconds for the short circuit to clear, and if it is not cleared in four seconds, then the power modules are shut down de-energizing the short circuit.

The short circuit protection scheme used in embodiments of the invention, protects wiring to the UPS 100 from short circuits and prevents circuit breakers in the power system for the UPS from tripping when a short circuit occurs in the load of the UPS.

In addition to providing detection of short circuits at the output of a UPS, in one embodiment of the present invention, which will now be described with reference to FIG. 9, detection circuitry 560 is provided in the power modules that allows the output fuse in each of the power modules to be checked for continuity during operation of the power module. In power modules of known UPS systems, output fuses are typically only checked during a self-test mode by opening a relay between the fuse and the output, putting a test voltage at the input side of the fuse, and checking for the test voltage at the output of the fuse.

Figure 9:
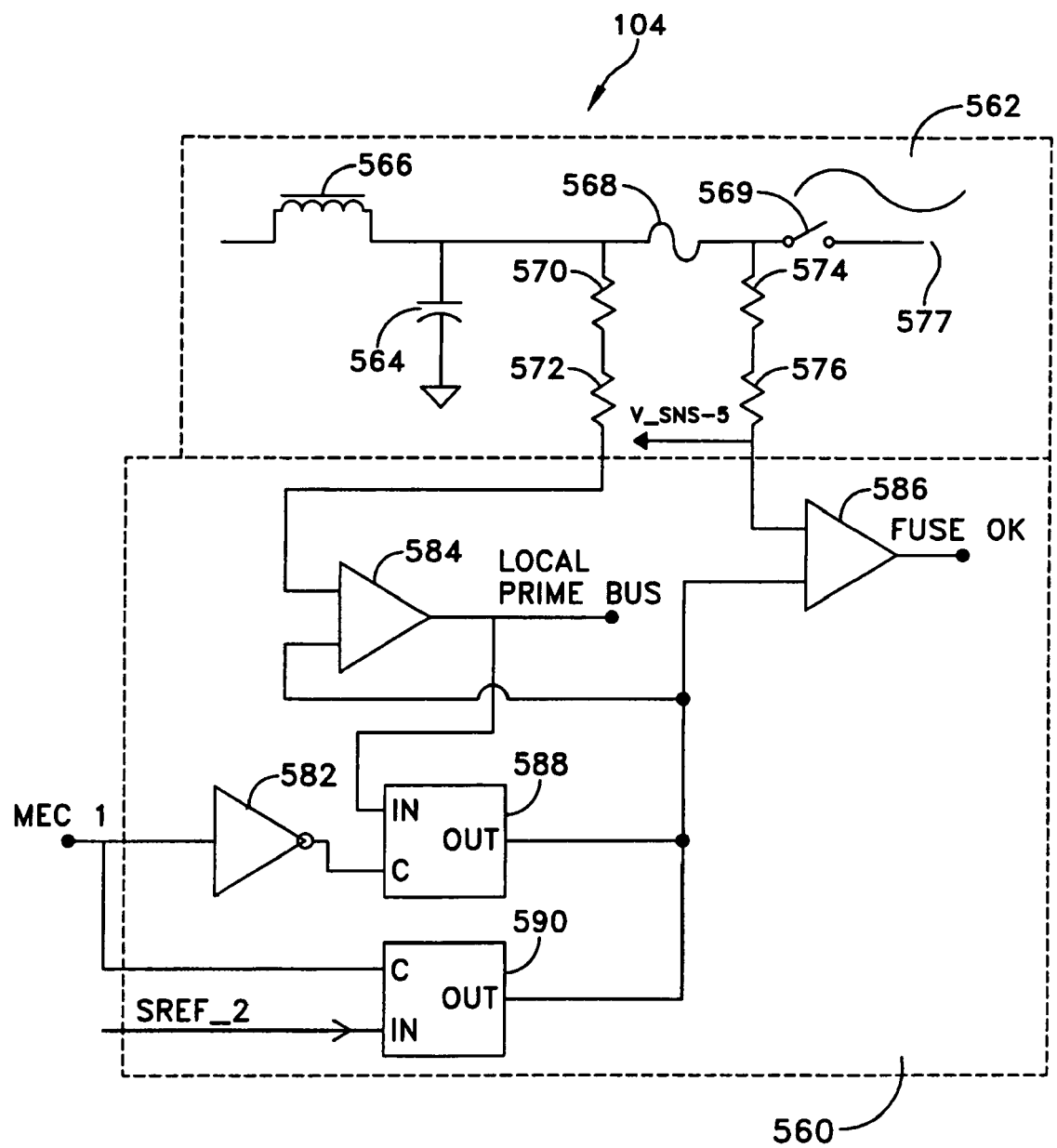
FIG. 9 is a functional diagram of fuse status detection circuitry used in at least one embodiment.

FIG. 9 is a functional block diagram showing the output circuitry 562 for one output phase and fuse detection circuitry 560 of a power module 104. The output circuitry 562 includes an output filter having a capacitor 564 and an inductor 566, a fuse 568, an output relay 569, sense resistors 570, 572, 574 and 576 and an output 577. In the power module, an output inverter provides output power to the output filter, which filters the power and provides the power at the output 577.

The detection circuitry includes an inverter 582, an amplifier 584, a comparator 586 and two switches 588 and 590. The detection circuitry has two modes of operation in which the state of the fuse 568 is tested, one mode during self-test and one mode during normal operation.

In the self-test mode, the relay 569 is opened and a signal MEC_1 from the power module controller is set high, turning on switch 590. When switch 590 is turned on, the signal SREF_2 is provided at the output of switch 590. Signal SREF_2 is a reference sine wave signal generated by the power module controller, and used in the self-test mode as the sine reference signal to control the output of the power module. The output of switch 590 is coupled to one input of the comparator 586. The other input of the comparator 586 is coupled to the output of the fuse 586 through resistors 574 and 576 to sample the voltage at the output of the fuse. If the sampled output signal substantially matches the SREF_2 signal, then the Fuse_OK signal from comparator 586 will be high indicating that the fuse is okay. If the fuse is opened, then the output of the comparator 586 will be low indicating that the fuse needs to be replaced.

During the self-test mode, the output signal of the power module is controlled using an error signal, identified as Local Prime Bus, generated by amplifier 584 based on a comparison of a sampled signal at the input of the fuse with the SREF_2 signal. During normal mode of operation, the signal Local Prime Bus is not used as the output of the power modules is controlled by the intelligence modules.

In the normal mode of operation, the relay 569 is closed and the status of the output fuse may be determined as follows. In normal mode of operation, signal MEC_1 is low, turning off switch 590 and turning on switch 588. The input of switch 588 is coupled to the output of amplifier 584 which provides the sampled voltage at the input of the fuse 568. The output of switch 588 is coupled to comparator 586. In the normal mode of operation, comparator 586 compares the voltage at the input of the fuse with the voltage at the output of the fuse, and if the voltages are substantially the same, indicating that the fuse is okay, then Fuse_OK will be set high. If the two inputs to comparator 586 are not substantially the same, then Fuse_OK will be low indicating that the fuse needs to be replaced. As understood by those skilled in the art, the comparators and amplifiers may include gain/attenuation stages to ensure that when the fuse is okay, the signals that are compared in the comparator 586 are at similar levels, and in phase.

In the embodiment described above, common circuitry is used to control the output of the power module and to detect the output condition of the fuse in both a self-test mode, and during normal operation. In some instances, when multiple power modules are used, the voltage at the output of the fuse may be affected by the voltages produced by the other power modules, and to obtain an accurate detection of the status of the fuse, it may be necessary to operate the power modules one at a time.

In embodiments of the present invention, the intelligence modules measure the output power of the UPS, and use these measurements to detect failures in the UPS, and in addition, these measurements are used to determine remaining runtime of the UPS when it is operating in battery mode. In single phase UPS systems, power measurements can typically be made using two-quadrant power meters that are capable of measuring power when the output voltage and current have the same polarity, which is typically the case for single phase systems. In split phase systems, depending on load requirements, the load of the UPS may be coupled between phase 1 and neutral, between phase 2 and neutral, or between phase 1 and phase 2. These load connections may result in reactive power in which the output current and the output voltage for one or both phases have opposite polarity, resulting in reactive power. To obtain accurate power readings, the reactive power should be deducted from the total power readings. In one embodiment of the invention described below, the intelligence modules include two four-quadrant power meters for accurately measuring the output power of each of the output phases of a split phase UPS system.

Figure 10:
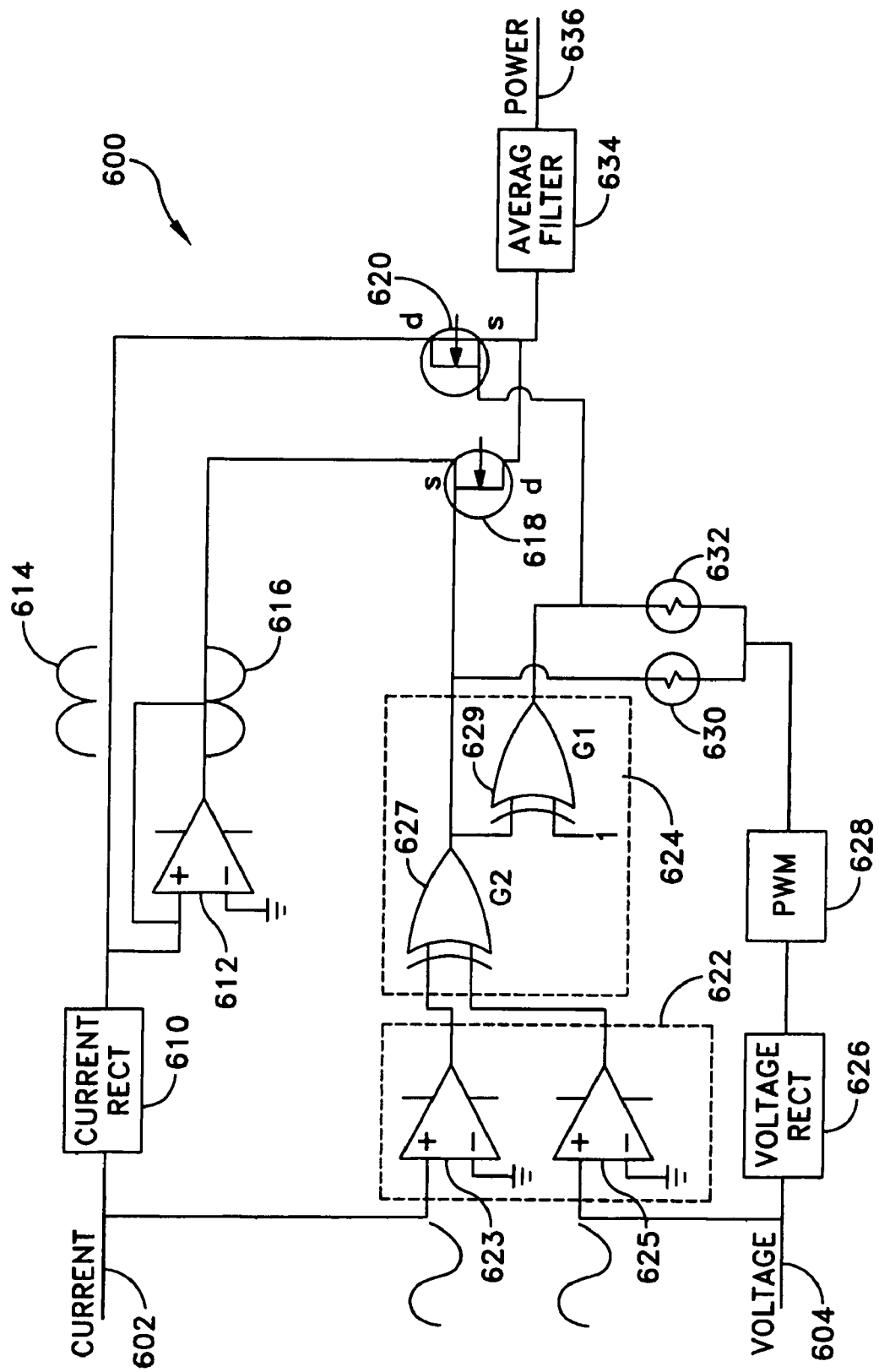
FIG. 10 is a functional block diagram of a four quadrant power meter used in embodiments of the invention.

FIG. 10 shows a block diagram of a four-quadrant power meter 600 that in one embodiment, is used in the I/O circuitry of the intelligence modules to measure the output power of each output phase. One power meter is used for each output phase. The power meter 600 includes a first input 602 to receive an output current signal and a second input 604 to receive an output voltage signal. The power meter also includes a current rectifier 610, an inverter 612, transistors 618 and 620, a polarity detector 622, a difference detector 624, a voltage rectifier 626, a pulse width modulation circuit 628, diodes 630 and 632, an averaging filter 634 and an output 636 that provides a dc signal having a voltage level proportional to the instantaneous power level.

In operation, the output current and voltage from one of the output phases is sensed by the intelligence modules and provided at input ports 602 and 604 of the power meter 600. The current rectifier 610 rectifies the current signal to produce full-wave rectified signal 614. The inverter 612 receives the rectified current signal and provides an inverted, full-wave rectified current signal 616. The rectified current signal is provided to the drain of transistor 620 and the inverted rectified signal is provided to the source of transistor 618.

The output voltage is rectified in the voltage rectifier 626 to produce a full-wave rectified signal and is converted to a pulse width modulated signal by the PWM circuit 628. The PWM circuit provides a pulse width modulated signal having a sample rate dependent on the voltage level of the signal. The output of the PWM circuit is provided at the input of two diodes 630 and 632. The input voltage signal and current signal is also provided to the input of the polarity detector circuit 622. The polarity detector circuit includes a pair of comparators 623 and 625, each of which provides a high signal at its output when the input is positive and a low signal at its output when the input signal is negative. The outputs of the comparators 623, 625 are fed into a difference detector 624. The difference detector includes two gates 627 and 629 that provide complementary outputs. The output of gate 627 is high when the polarity of the input voltage and current signals is the same, and the output of gate 627 is low when they are different. The output of gate 629 is high when the polarity of the output voltage and current signals is different and low when the polarity of the signals is the same.

The output of gate 627 is combined with the PWM signal from diode 630 turning on transistor 618 when the output of gate 627 is low. The output of gate 629 is combined with the PWM signal from diode 632 turning on transistor 620 when the output of gate 629 is low. When the input voltage and current have the same polarity, the voltage PWM signal is multiplied by the rectified current signal using transistor 620. When the input voltage and current have the opposite polarity, the voltage PWM signal is multiplied by the inverter, rectified current signal using transistor 618. The output of transistors 618 and 620 are input to the averaging filter 634, which provides an output DC signal having a voltage level proportional to the instantaneous power. In one embodiment, the output filter is implemented using a low pass filter with a cut-off frequency approximately equal to the output line frequency, so that the output power is effectively the average power over a line cycle. The output power signal is input to an integrating analog to digital converter in the master processor.

Embodiments of the present invention that utilize the four-quadrant power meter of FIG. 10 provide accurate power measurements in split-phase UPS systems allowing accurate battery run time calculations to be made.

In one embodiment of the invention, in addition to the four-quadrant power meters discussed above, each of the power modules includes a two-quadrant power meter that measures the output power of the power module to ensure that the output power does not exceed the power module ratings. Known prior art power modules for single phase systems include single quadrant power meters that will only operate when the current and the voltage are both positive. As discussed above, in split-phase systems, the output current may be either positive or negative when the voltage is positive, and accordingly it is desirable to account for both positive and negative current in UPS systems having split-phase outputs.

Figure 11:
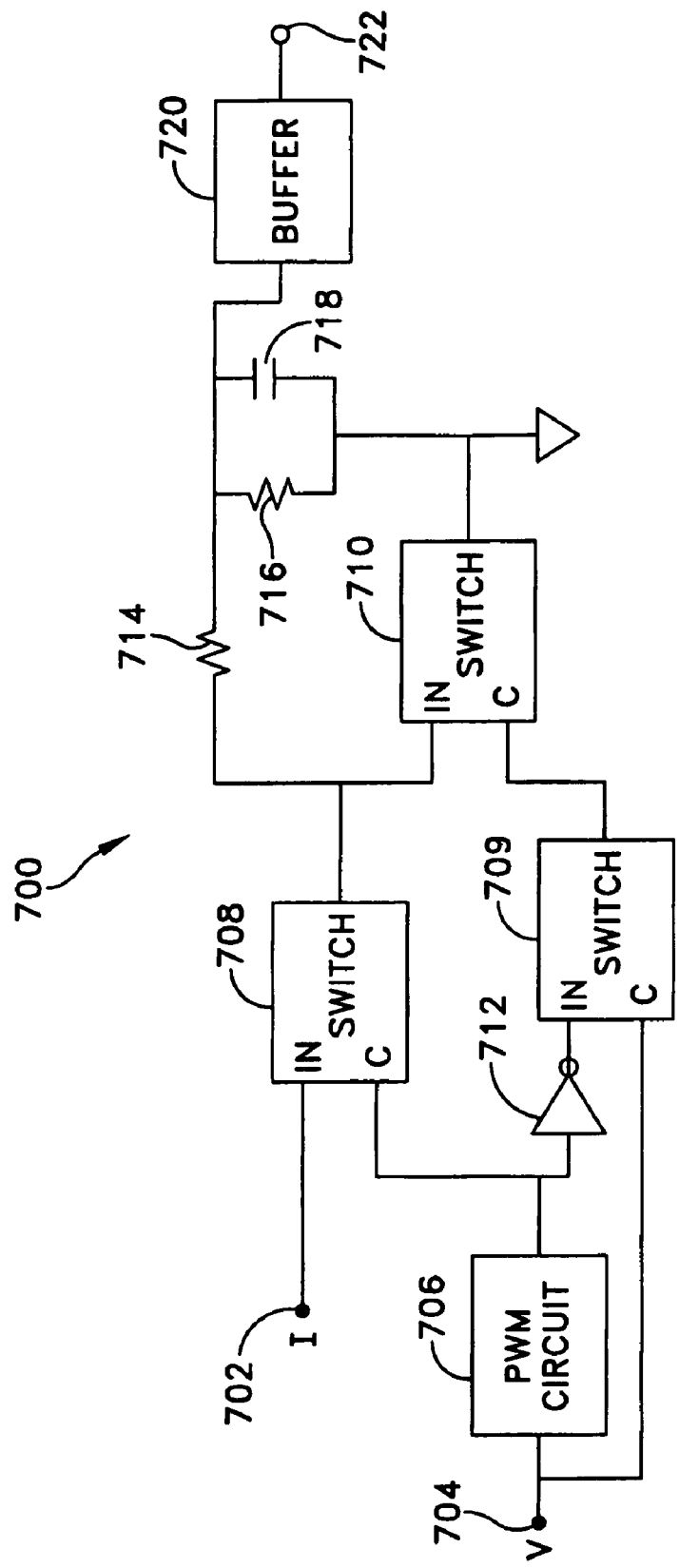
FIG. 11 is a functional block diagram of a two quadrant power meter used in embodiments of the invention.

The power module two-quadrant power meter 700 will now be described with reference to FIG. 11, which shows a functional block diagram of the power meter. The two-quadrant power meter includes a current input 702, a voltage input 704, a PWM circuit 706, a first switch 708, a second switch 709 and a third switch 710, an inverter 712, resistors 714 and 716, a capacitor 718, an output buffer 720, and an output port 722 that provides an output power signal.

In the power meter 700, input port 702 receives a signal that is representative of the output current of the power module, and input port 704 receives a signal that is representative of the output voltage of the power module. The PWM circuit 706, for positive input voltages, provides an output PWM signal sampled at a rate of 20 kHz and having pulse widths proportional to the input voltage. For negative input voltages, the output of the PWM circuit remains low. The output of the PWM circuit is provided to the control input of switch 708 and the input of switch 708 receives the input current signal. The output of switch 708 effectively provides the current waveform modulated by the PWM signal from the PWM circuit.

During positive pulses of the PWM signal, capacitor 718 is charged through resistor 714 by the current signal. During off times of the PWM signal (between pulses), switch 708 is turned off, switch 710 is turned on, and capacitor 718 discharges through resistor 714. Accordingly, the average voltage across capacitor 718 is a function of the duty cycle of the PWM signal and the input current level and is proportional to the power. The voltage across the capacitor is input to a buffer 720, whose output is coupled to the controller in the power module. The buffer 720 provides filtering and buffering of the output signal before it is provided to the controller. In one embodiment, resistor 714 has a value of 121 kohms, resistor 716 has a value of 2.0 Mohms, and capacitor 718 has a value of 1 microfarad, however other values may be used for these components.

For negative input current and positive input voltage, the power meter 700 will operate in the same manner as described above for positive current values to provide a correct power reading. For negative input voltage, the PWM circuit will remain low and switch 708 will remain off. Further, switches 709 and 710 will be off, and resistor 714 is then floating, allowing capacitor 718 to remain charged for negative input voltage.

For split phase systems, each power module includes two of the two-quadrant power meters, and the controller is able to determine the total power draw by adding the outputs of the power meters.

In modular UPS systems described above, in some instances certain functions have been described as being performed in specific modules. In other embodiments, these functions may be performed in other modules and/or the complete functionality of modules could be combined. Further, many of the features described above may be implemented in UPS systems that are not of the modular type.

Embodiments of the present invention have been described for use with on-line UPS systems. Other embodiments of the present invention may also be used with off-line UPSs, other types of UPS's and may also be used with devices other than UPSs.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power supply system comprising:
a frame;
a power input to receive input power from a power source;
a power output to provide output power to a load;

at least one battery module mounted in the frame and having a battery output that provides battery power;

at least one power module mounted in the frame and coupled to the power input to receive the input power, coupled to the battery output to receive the battery power, and coupled to the power output to provide the output power from at least one of the battery power and the input power;

a first controller coupled to the at least one power module; and a second controller, substantially similar to the first controller, coupled to the first controller, and coupled to the at least one power module;

wherein each of the first controller and the second controller is configured to determine operational parameters of the power supply system and store a first set of parameters determined by the first controller and a second set of parameters determined by the second controller.

2. The power supply system of claim 1, wherein the first controller functions as a main controller in the power supply system and controls the output power of the power module, and wherein the first controller and the second controller are configured to allow the second controller to control the output power upon failure of the first controller.

3. The power supply system of claim 2, wherein the at least one power module includes a plurality of power modules, and the at least one battery module includes a plurality of battery modules.

4. The power supply system of claim 1, further comprising a communications bus coupled to the first controller, the second controller and the at least one power module to provide duplex communication between the first controller, the second controller and the at least one power module;

wherein the first controller is configured to function as master of the communications bus and control communications on the bus, and the second controller is configured to function as master of the communications bus upon failure of the first controller.

5. The power supply system of claim 4, wherein each of the first controller and the second controller includes a main processor, an internal communications bus coupled to the communications bus through a relay, and a memory device, coupled to the internal communications bus, that stores operational parameters of the power supply system, and wherein the main processor in the second controller is configured to open the relay in the second controller and send updated operational parameters to the memory device over the internal communications bus.

6. The power supply system of claim 1, wherein the power input is configured to receive input power having a first input phase line, a second input phase line and a neutral input line, wherein the first controller is coupled to the power input and configured to detect an input phase difference between the first input phase line and the second input phase line, and to control the power module to provide output power having a first output phase line, a second output phase line and a neutral output line, with an output phase difference between the first output phase line and the second output phase line substantially equal to the input phase difference.

7. The power supply system of claim 1, wherein each of the first controller and the second controller includes a cold start button, and wherein the power supply system is configured to be powered on from battery power with no input power present when one of the cold start buttons is activated by a user.

8. The power supply system of claim 7, wherein the power supply system is configured such that activation of the cold start button powers on the power supply system with no input power present, and with substantially zero current from the at least one battery module prior to activation of the cold start button.

9. The power supply system of claim 1, wherein the first controller is coupled to the power input and is configured to detect input voltage and input current, and to reduce input current draw of the power supply system upon detection that the input voltage is less than a predetermined threshold.

10. The power supply system of claim 9, wherein the first controller is configured to reduce battery charging current in the power supply system upon detection that the input voltage is less than the predetermined threshold.

11. The power supply system of claim 1, further comprising a four-quadrant power meter coupled to the power output that determines output power of the power supply system.

12. The power supply system of claim 1, wherein the at least one power module includes a two-quadrant power meter that determines output power of the power module.

13. The power supply system of claim 1, further comprising an output fuse coupled to the power output, and a detection circuit, coupled to the output fuse and to the first controller that detects a voltage across the output fuse.

14. The power supply system of claim 1, wherein each of the first controller and the second controller are adapted to receive an input signal from the frame, and based on a state of the input signal, to function as a main controller or a redundant controller.

15. The power supply system of claim 1, wherein the first controller includes a memory device, and is configured to sense an output voltage at the power output, and compare the output voltage with upper and lower threshold levels derived from data contained in the memory device to determine if the output voltage is within a predetermined range.

16. The power supply system of claim 15, wherein the first controller is configured to sense an output current at the power output, compare the output current with a short circuit current value, compare the output voltage with an output short circuit voltage value, and provide indication of a short circuit present at the output if the output current exceeds the short circuit current value and the output voltage is less than the output short circuit voltage value.

17. A power supply system comprising:

a power input to receive input power from a power source;

a power output to provide output power to a load;

at least one battery module having a battery output that provides battery power;

at least one power module coupled to the power input to receive the input power, coupled to the battery output to receive the battery power, and coupled to the power output to provide the output power;

a first controller coupled to the at least one power module; and a second controller, coupled to the first controller, and coupled to the at least one power module; and a communications bus coupled to the first controller, the second controller and the at least one power module to provide duplex communication between the first controller, the second controller and the at least one power module;

wherein the first controller is configured to function as master of the communications bus and control communications on the bus, and the second controller is configured to function as master of the communications bus upon failure of the first controller.

18. The power supply system of claim 17, wherein the first controller functions as a main controller in the power supply system and controls the output power of the power module, and wherein the first controller and the second controller are configured to allow the second controller to control the output power upon failure of the first controller.

19. The power supply system of claim 18, wherein the at least one power module includes a plurality of power modules, and the at least one battery module includes a plurality of battery modules.

20. The power supply system of claim 17, wherein each of the first controller and the second controller includes a main processor, an internal communications bus coupled to the communications bus through a relay, and a memory device, coupled to the internal communications bus, that stores operational parameters of the power supply system, and wherein the main processor in the second controller is configured to open the relay in the second controller and send updated operational parameters to the memory device over the internal communications bus.

21. The power supply system of claim 17, wherein the power input is configured to receive input power having a first input phase line, a second input phase line and a neutral input line, wherein the first controller is coupled to the power input and configured to detect an input phase difference between the first input phase line and the second input phase line, and to control the power module to provide output power having a first output phase line, a second output phase line and a neutral output line, with an output phase difference between the first output phase line and the second output phase line substantially equal to the input phase difference.

22. The power supply system of claim 17, wherein each of the first controller and the second controller includes a cold start button, and wherein the power supply system is configured to be powered on from battery power with no input power present when one of the cold start buttons is activated by a user.

23. The power supply system of claim 22, wherein the power supply system is configured such that activation of the cold start button powers on the power supply system with no input power present, and with substantially zero current from the at least one battery module prior to activation of the cold start button.

24. The power supply system of claim 17, wherein the first controller is coupled to the power input and is configured to detect input voltage and input current, and to reduce input current draw of the power supply system upon detection that the input voltage is less than a predetermined threshold.

25. The power supply system of claim 24, wherein the first controller is configured to reduce battery charging current in the power supply system upon detection that the input voltage is less than the predetermined threshold.

26. The power supply system of claim 17, further comprising a four-quadrant power meter coupled to the power output that determines output power of the power supply system.

27. The power supply system of claim 17, wherein the at least one power module includes a two-quadrant power meter that determines output power of the power module.

28. The power supply system of claim 17, further comprising an output fuse coupled to the power output, and a detection circuit, coupled to the output fuse and to the first controller that detects a voltage across the output fuse.

29. The power supply system of claim 17, wherein each of the first controller and the second controller are adapted to receive an input signal from the frame, and based on a state of the input signal, to function as a main controller or a redundant controller.

30. The power supply system of claim 17, wherein the first controller includes a memory device, and is configured to sense an output voltage at the power output, and compare the output voltage with upper and lower threshold levels derived from data contained in the memory device to determine if the output voltage is within a predetermined range.

31. The power supply system of claim 30, wherein the first controller is configured to sense an output current at the power output, compare the output current with a short circuit current value, compare the output voltage with an output short circuit voltage value, and provide indication of a short circuit present at the output if the output current exceeds the short circuit current value and the output voltage is less than the output short circuit voltage value.

32. A power supply system comprising:
an input to receive input power having a first input phase line, a second input phase line and a neutral input line;
an output to provide output power, the output having a first output phase line, a second output phase line and a neutral output line;
a battery that provides battery power; and
a controller coupled to the input, to the output and to the battery and configured to control the power supply system to provide the output power from at least one of the input power and the battery power;
wherein the controller is configured to detect an input phase difference between the first input phase line and the second input phase line, and to provide output power with an output phase difference between the first output phase line and the second output phase line substantially equal to the input phase difference.

33. The power supply system of claim 32, wherein the controller is configured to measure an input voltage, compare the input voltage with a threshold voltage, and implement a current reduction scheme to lower input current to the power supply system when the input voltage is less than the threshold voltage.

34. The power supply system of claim 33, wherein the current reduction scheme includes lowering a charge current to the battery.

35. A power supply system comprising:
a frame;
a power input to receive input power from a power source;
a power output to provide output power to a load;
at least one battery module mounted in the frame and having a battery output that provides battery power;
at least one power module mounted in the frame and coupled to the power input to receive the input power, coupled to the battery output to receive the battery power, and coupled to the power output to provide the output power from at least one of the battery power and the input power;
a first controller module, mounted in the frame, coupled to the at least one power module and the at least one battery module; and
a first cold start button operatively coupled to the at least one battery module;
wherein the power supply system is configured to be powered on from battery power with no input power present from a powered down mode in which there is no current being drawn from the battery when the first cold start button is activated by a user.

36. The power supply system of claim 35, further comprising:
a second controller module mounted in the frame, the second controller module being substantially similar to the first controller module and functioning as a redundant controller upon failure of the first controller module; and a second cold start button operatively coupled to the at least one battery module;

wherein the power supply system is configured to be powered on from battery power with no input power present from a powered down mode in which there is no current being drawn from the battery when either the first cold start button or the second cold start button is activated.

37. A method of controlling an uninterruptible power supply system having a first controller, a second controller, at least one power module, and a communications bus coupled between the first controller, the second controller and the at least one power module, the method comprising:

controlling output power of the uninterruptible power supply and communications over the communications bus using the first controller; and upon failure of the first controller, controlling the output power and communications over the communications bus using the second controller;

wherein the uninterruptible power supply has a power input that is configured to receive input power having a first input phase line, a second input phase line and a neutral input line, and wherein the method further comprises:

detecting an input phase difference between the first input phase line and the second input phase line; and providing output power having a first output phase line, a second output phase line and a neutral output line, with an output phase difference between the first output phase line and the second output phase line substantially equal to the input phase difference.

38. A method of controlling an uninterruptible power supply system having a first controller, a second controller, at least one power module, and a communications bus coupled between the first controller, the second controller and the at least one power module, the method comprising:

controlling output power of the uninterruptible power supply and communications over the communications bus using the first controller; and upon failure of the first controller, controlling the output power and communications over the communications bus using the second controller;

wherein each of the first controller and the second controller includes a cold start button, and wherein the method further comprises controlling the uninterruptible power supply to be powered on from battery power with no input power present when one of the cold start buttons is activated by a user.

39. A method of providing uninterruptible output power in a power supply having an input to receive input power having a first input phase line, a second input phase line and a neutral input line, and an output to provide output power, the output having a first output phase line, a second output phase line and a neutral output line, the method comprising:

detecting an input phase difference between the first input phase line and the second input phase line; and providing output power with an output phase difference between the first output phase line and the second output phase line substantially equal to the input phase difference.

40. The method of claim 39, further comprising reducing input current to the power supply when the an input voltage at the input is less than a threshold voltage.

41. The method of claim 40, wherein reducing input current includes lowering a charge current to at least one battery in the power supply.

42. A power supply system comprising:

a frame;

a power input to receive input power from a power source;

a power output to provide output power to a load;

at least one battery module mounted in the frame and having a battery output that provides battery power;

at least one power module mounted in the frame and coupled to the power input to receive the input power, coupled to the battery output to receive the battery power, and coupled to the power output to provide the output power from at least one of the battery power and the input power;

a first controller coupled to the at least one power module; and a second controller, substantially similar to the first controller, coupled to the first controller, and coupled to the at least one power module;

wherein each of the first controller and the second controller includes means for measuring operational parameters of the power supply system and means for storing operational parameters measured by the first controller and measured by the second controller.

43. The power supply system of claim 42, wherein the first controller and the second controller include means for establishing one of the first controller and the second controller as a main controller and for establishing one of the first controller and the second controller as a redundant controller, and means for passing control of the power supply system from the main controller to redundant controller upon failure of the main controller.

44. The power supply system of claim 43, wherein the at least one power module includes a plurality of power modules, and the at least one battery module includes a plurality of battery modules.

45. The power supply system of claim 43, further comprising a communications bus for providing duplex communications between the first controller and the second controller and means for establishing the main controller as master of the communications bus and for establishing the redundant controller as master of the communications bus upon failure of the main controller.

46. The power supply system of claim 42, wherein the power input is configured to receive input power having a first input phase line, a second input phase line and a neutral input line, further comprising means for detecting an input phase difference between the first input phase line and the second input phase line, and means for providing output power having a first output phase line, a second output phase line and a neutral output line, with an output phase difference between the first output phase line and the second output phase line substantially equal to the input phase difference.

47. The power supply system of claim 42, further comprising means for starting the power supply system from battery power with no input power present.

48. The power supply system of claim 47, further comprising means for isolating battery voltages during a power down mode with no input power present such that there is substantially zero current from the battery module, and wherein the means for starting includes means for starting the power supply system from the power down mode.

49. The power supply system of claim 42, further comprising means for reducing input current draw of the power supply system upon detection that an input voltage of the input power is less than a predetermined threshold.

50. The power supply system of claim 49, wherein the means for reducing input current draw include means for reducing battery charging current.

51. The power supply system of claim 42, further comprising means for measuring active power at the power output.

52. The power supply system of claim 42, wherein the at least one power module includes means for measuring output power of the power module for positive output voltages and for positive and negative output currents.

53. The power supply system of claim 42, further comprising an output fuse coupled to the power output, and means for detecting a voltage across the output fuse.

54. The power supply system of claim 42, further comprising means for storing operational parameters for the power supply system and means for comparing an output voltage at the power output with upper and lower threshold levels derived from the operational parameters to determine if the output voltage is within a predetermined range.

55. The power supply system of claim 54, further comprising means for bypassing the at least one power module to provide input power to the power output, and means for detecting a short circuit at the power output and disabling the bypass means.

56. A power supply system comprising:
a power input to receive input power from a power source;
a power output to provide output power to a load;
at least one battery module having a battery output that provides battery power;
at least one power module coupled to the power input to receive the input power, coupled to the battery output to receive the battery power, and coupled to the power output to provide the output power;
a first controller coupled to the at least one power module;
a second controller, coupled to the first controller, and coupled to the at least one power module; and
a communications bus coupled to the first controller, the second controller and the at least one power module to provide duplex communication between the first controller, the second controller and the at least one power module; and
means for establishing the first controller as master of the communications bus and for establishing the second controller as master of the communications bus upon failure of the first controller.

57. The power supply system of claim 56, wherein the first controller and the second controller include means for establishing one of the first controller and the second controller as a main controller and for establishing one of the first controller and the second controller as a redundant controller, and means for passing control of the power supply system from the main controller to the redundant controller upon failure of the main controller.

58. The power supply system of claim 57, wherein the at least one power module includes a plurality of power modules, and the at least one battery module includes a plurality of battery modules.

59. The power supply system of claim 56, wherein the power input is configured to receive input power having a first input phase line, a second input phase line and a neutral input line, further comprising means for detecting an input phase difference between the first input phase line and the second input phase line, and means for providing output power having a first output phase line, a second output phase line and a neutral output line, with an output phase difference between the first output phase line and the second output phase line substantially equal to the input phase difference.

60. The power supply system of claim 56, further comprising means for starting the power supply system from battery power with no input power present.

61. The power supply system of claim 60, further comprising means for isolating battery voltages during a power down mode with no input power present such that there is substantially zero current from the battery module, and wherein the means for starting includes means for starting the power supply system from the power down mode.

62. The power supply system of claim 56, further comprising means for reducing input current draw of the power supply system upon detection that the input voltage is less than a predetermined threshold.

63. The power supply system of claim 62, wherein the means for reducing input current draw include means for reducing battery charging current.

64. The power supply system of claim 56, further comprising means for measuring active power at the power output.

65. The power supply system of claim 56, wherein the at least one power module includes means for measuring output power of the power module for positive output voltages and for positive and negative output currents.

66. The power supply system of claim 56, further comprising an output fuse coupled to the power output, and means for detecting a voltage across the output fuse.

67. The power supply system of claim 56, further comprising means for storing operational parameters for the power supply system, and means for comparing an output voltage at the power output with upper and lower threshold levels derived from the operational parameters to determine if the output voltage is within a predetermined range.

68. The power supply system of claim 67, further comprising means for bypassing the at least one power module to provide input power to the power output, and means for detecting a short circuit at the power output and means for disabling the bypass means.

69. A power supply system comprising:
an input to receive input power having a first input phase line, a second input phase line and a neutral input line;
an output to provide output power, the output having a first output phase line, a second output phase line and a neutral output line;
a battery that provides battery power;
a controller coupled to the input, to the output and to the battery and configured to control the power supply system to provide the output power from at least one of the input power and the battery power; and
means for detecting an input phase difference between the first input phase line and the second input phase line, and providing output power with an output phase difference between the first output phase line and the second output phase line substantially equal to the input phase difference.

70. The power supply system of claim 69, further comprising means for reducing input current to the power supply system when input voltage is less than a threshold voltage.

71. The power supply system of claim 70, wherein the means for reducing input current includes means for lowering a charge current to the battery.

72. A method of providing redundant control of an uninterruptible power supply having a first controller and a second controller, the method comprising:
determining a first set of values corresponding to operational parameters of the uninterruptible power supply using the first controller;
determining a second set of values corresponding to the operational parameters of the uninterruptible power supply using the second controller;
storing the first set of values and the second set of values in the first controller;

storing the first set of values and the second set of values in the second controller;

controlling output power of the uninterruptible power supply using the first controller; and upon failure of the first controller, controlling the output power of the uninterruptible power supply using the second controller.

73. The method of claim 72, wherein the uninterruptible power supply includes a communications bus, and the method further comprising:

controlling communications on the communications bus using the first controller; and upon failure of the first controller, controlling communications on the communications bus using the second controller.

74. The method of claim 72, wherein the uninterruptible power supply has a power input that is configured to receive input power having a first input phase line, a second input phase line and a neutral input line, and wherein the method further comprises:

detecting an input phase difference between the first input phase line and the second input phase line; and providing output power having a first output phase line, a second output phase line and a neutral output line, with an output phase difference between the first output phase line and the second output phase line substantially equal to the input phase difference.

75. The method of claim 72, wherein each of the first controller and the second controller includes a cold start button, and wherein the method further comprises controlling the uninterruptible power supply to be powered on from battery power with no input power present when one of the cold start buttons is activated by a user.

76. The method of claim 75, further comprising:

detecting input voltage and input current to the uninterruptible power supply; and reducing input current draw of the uninterruptible power supply upon detection that the input voltage is less than a predetermined threshold.

77. The method of claim 76, wherein reducing input current draw includes reducing battery charging current in the uninterruptible power supply.

78. The method of claim 72, wherein the uninterruptible power supply includes an output fuse and wherein the method further comprises detecting a voltage across the output fuse to check the status of the fuse during operation of the uninterruptible power supply.

79. The method of claim 72, wherein the first controller includes a memory device, and wherein the method further comprises:

sensing an output voltage at an output of the uninterruptible power supply; and comparing the output voltage with upper and lower threshold levels derived from data contained in the memory device to determine if the output voltage is within a predetermined range.

80. The method of claim 79, further comprising:

sensing an output current at the output;

comparing the output current with a short circuit current value;

comparing the output voltage with an output short circuit voltage value, and providing indication of a short circuit present at the output if the output current exceeds the short circuit current value and the output voltage is less than the output short circuit voltage value.

81. A method of controlling an uninterruptible power supply system having a first controller, a second controller, at least one power module, and a communications bus coupled between the first controller, the second controller and the at least one power module, the method comprising:

controlling output power of the uninterruptible power supply and communications over the communications bus using the first controller; and upon failure of the first controller, controlling the output power communications over the communications bus using the second controller;

detecting input voltage and input current to the uninterruptible power supply; and reducing input current draw of the uninterruptible power supply upon detection that the input voltage is less than a predetermined threshold.

82. The method of claim 81, wherein reducing input current draw includes reducing battery charging current in the uninterruptible power supply.

83. The method of claim 81, wherein the uninterruptible power supply includes an output fuse and wherein the method further comprises detecting a voltage across the output fuse to check the status of the fuse during operation of the uninterruptible power supply.

84. The method of claim 81, wherein the first controller includes a memory device, and wherein the method further comprises:

sensing an output voltage at an output of the uninterruptible power supply; and comparing the output voltage with upper and lower threshold levels derived from data contained in the memory device to determine if the output voltage is within a predetermined range.

85. The method of claim 84, further comprising:

sensing an output current at the output;

comparing the output current with a short circuit current value;

comparing the output voltage with an output short circuit voltage value, and providing indication of a short circuit present at the output if the output current exceeds the short circuit current value and the output voltage is less than the output short circuit voltage value.

* * * * *

UNITED STATES PATENT AND TRADEMARK OFFICE
CERTIFICATE OF CORRECTION

PATENT NO. : 7,446,433 B2
APPLICATION NO. : 10/764344
DATED : November 4, 2008
INVENTOR(S) : Francis J. Masciarelli et al.

It is certified that error appears in the above-identified patent and that said Letters Patent is hereby corrected as shown below:

In the claims:
Column 34, claim 81, line 20, after the word "power" insert --and--.

Signed and Sealed this

Twenty-ninth Day of September, 2009

David J. Kappos
*Director of the United States Patent and Trademark Office*